US011636396B2

(12) United States Patent
Sarin

(10) Patent No.: US 11,636,396 B2
(45) Date of Patent: Apr. 25, 2023

(54) CHILD TOKENS FOR IMPROVED TRANSACTION DATA STORAGE, AND REDUCED TRANSACTION INFORMATION PAYLOADS BASED ON TRANSACTION PREDICTIONS FOR QUICKER COMPUTERIZED PAYMENT PROCESSING

(71) Applicant: PayPal, Inc., San Jose, CA (US)

(72) Inventor: Pankaj Sarin, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 299 days.

(21) Appl. No.: 16/999,271

(22) Filed: Aug. 21, 2020

(65) Prior Publication Data
US 2022/0058516 A1   Feb. 24, 2022

(51) Int. Cl.
*G06N 20/00* (2019.01)
*G06K 7/14* (2006.01)
(Continued)

(52) U.S. Cl.
CPC ......... *G06N 20/00* (2019.01); *G06F 12/0802* (2013.01); *G06K 7/1413* (2013.01); *G06Q 40/02* (2013.01)

(58) Field of Classification Search
CPC .......... G06N 20/00; G06N 3/08; G06N 5/048; G06N 7/005; G06N 20/10; G06F 12/0802;
(Continued)

(56) References Cited

U.S. PATENT DOCUMENTS

| | | | |
|---|---|---|---|
| 2003/0011809 A1* | 1/2003 | Suzuki | G06F 21/608 358/1.15 |
| 2013/0046607 A1* | 2/2013 | Granville, III | G06Q 30/0241 705/14.27 |

FOREIGN PATENT DOCUMENTS

| | | | | |
|---|---|---|---|---|
| AU | 2013231899 A1 | * | 9/2014 | ............. G06Q 20/10 |
| WO | WO-2004029889 A1 | * | 4/2004 | ........... G06Q 20/347 |

OTHER PUBLICATIONS

Aditya Aladangady, From Transactions Data to Economic Statistics: Constructing Real-time, High-frequency, Geographic Measures of Consumer Spending, 2019 (Year: 2019).*

* cited by examiner

*Primary Examiner* — Tarek Elchanti
(74) *Attorney, Agent, or Firm* — Greenberg Traurig, LLP

(57) ABSTRACT

Systems, computer-implemented methods, apparatus, and/or computer program products that facilitate implementation of child tokens for improved transaction data storage and/or implementation of reduced transaction information payloads for quicker computerized payment processing are provided. In various embodiments, a system can comprise a scanner component that can scan a financial instrument during a current transaction, thereby extracting financial instrument data associated with the current transaction. In various instances, the system can further comprise a logging component, that can identify in an electronic transaction log a first data entry that corresponds to a previous transaction. In various cases, the first data entry can list previous financial instrument data associated with the previous transaction, and the previous financial instrument data can match the current financial instrument data. In various aspects, the system can further comprise a token component that can store in a second data entry of the electronic transaction log an electronic token. In various cases, the second data entry can correspond to the current transaction, the electronic token can reference the first data entry, and the electronic token can be stored instead of the current financial instrument data. In various embodiments, a system can comprise a reference identifier database that can correlate a plurality of users to a plurality of financial instrument data and to a plurality of reference identifiers. In various instances, the system can further comprise a prediction component that can predict, (Continued)

via a trained machine learning classifier, that a user from a the plurality of users is likely to initiate a transaction within a threshold period of time. In various aspects, the system can further comprise a transmitter component that can transmit an instruction to a computerized transaction settlement system which can cause the computerized transaction settlement system to cache financial instrument data from the plurality of financial instrument data that corresponds to the predicted user. In various cases, the transmitter component can transmit to a computerized financial instrument scanning system a reference identifier from the set of reference identifiers that corresponds to the predicted user. In various aspects, the system can further comprise a receiver component that can receive a reduced transaction information payload from the computerized financial instrument scanning system after the computerized financial instrument scanning system scans a financial instrument associated with the reference identifier corresponding to the predicted user.

17 Claims, 24 Drawing Sheets

(51) Int. Cl.
  *G06F 12/0802* (2016.01)
  *G06Q 40/02* (2012.01)
(58) Field of Classification Search
  CPC . G06F 16/24552; G06K 7/1413; G06Q 40/02
  USPC .................. 706/12; 705/14.27; 358/1.15
  See application file for complete search history.

US 11,636,396 B2

CHILD TOKENS FOR IMPROVED TRANSACTION DATA STORAGE, AND REDUCED TRANSACTION INFORMATION PAYLOADS BASED ON TRANSACTION PREDICTIONS FOR QUICKER COMPUTERIZED PAYMENT PROCESSING

TECHNICAL FIELD

The subject disclosure relates generally to computerized financial instrument scanning systems and/or computerized payment processing systems, and more specifically to the implementation of child tokens for improved transaction data storage and/or to the implementation of reduced transaction information payloads based on transaction predictions for quicker computerized payment processing.

BACKGROUND

A conventional computerized financial instrument scanning system (e.g., a credit card reader, a barcode scanner) operates in an offline state. That is, a conventional computerized financial instrument scanning system collects payment information during transactions (e.g., by swiping credit cards, by scanning barcodes), locally stores such payment information for each transaction, subsequently connects to and/or synchronizes with a network to transmit the payment information for each transaction to a computerized payment processor which relays the payment information for each transaction to a computerized transaction settlement system for settlement, and then discards the collected payment information (e.g., the computerized financial instrument scanning system can have no need to retain such information after syncing with the network). Such a conventional computerized financial instrument scanning system includes a local memory and/or data structure that has a set of authentication/authorization data slots, where each authentication/authorization data slot is dedicated to storing the metadata of a respectively corresponding transaction (e.g., data slot 1 contains the payment data and/or context data recorded during transaction 1, data slot 2 contains the payment data and/or context data recorded during transaction 2, data slot 3 contains the payment data and/or context data recorded during transaction 3, and so on). When a particular customer engages in multiple transactions before the conventional computerized financial instrument scanning system synchronizes with the network, multiple authentication/authorization data slots can be consumed. This can result in wasted memory/storage space.

Conventionally, a computerized transaction settlement system (e.g., a backend clearinghouse that processes and/or settles electronic payment transfers) periodically receives a transaction information payload (e.g., a transaction data packet) from a computerized payment processing system, which can have received the transaction information payload from a computerized financial instrument scanning system (e.g., a credit card reader and/or barcode scanner). Such a transaction information payload contains metadata for each transaction recorded and/or facilitated by the computerized financial instrument scanning system since the most recent synchronization between the computerized financial instrument scanning system and the network (e.g., the transaction information payload can indicate the time of each transaction recorded by the credit card reader since the last syncing, the monetary amount of each transaction recorded by the credit card reader since the last syncing, the credit card number of each transaction recorded by the credit card reader since the last syncing, the merchant/vendor address of each transaction recorded by the credit card reader since the last syncing, and/or so on). In various aspects, such conventional transaction information payloads can result in the unnecessary expenditure and/or waste of computing resources.

Systems and/or techniques that can ameliorate one or more of these issues are desirable.

DETAILED DESCRIPTION

Figure 1:
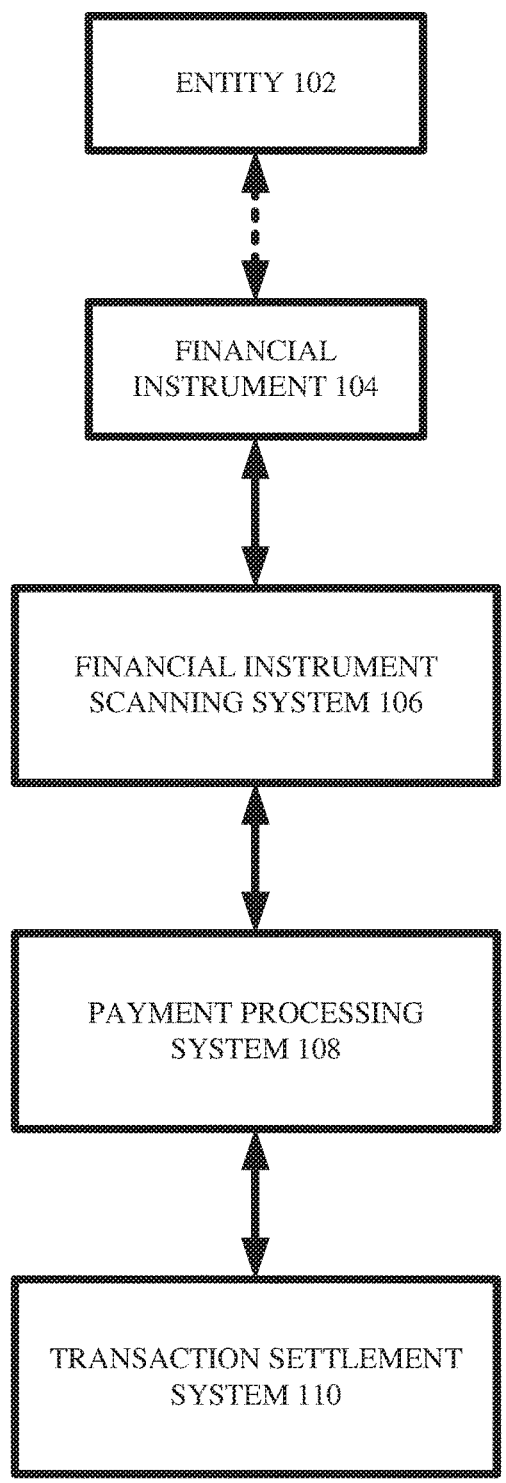
FIG. 1 illustrates a high-level block diagram of an example, non-limiting system that facilitates implementation of child tokens for improved transaction data storage and/or implementation of reduced transaction information payloads based on transaction predictions for quicker computerized payment processing in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Payment transfers for modern commercial transactions can be facilitated electronically by computerized systems. Specifically, an entity (e.g., a customer, a consumer, and/or a buyer, whether human or otherwise) can purchase, rent, and/or otherwise procure a product and/or service by using a financial instrument (e.g., a credit card, a debit card, a gift card, a barcode). In various cases, payment information (e.g., credit card number, bank account number, gift card number) of the entity can be encoded/stored on and/or within the financial instrument (e.g., encoded on a magstripe of a credit card, stored within a microchip of a credit card, represented in the visual pattern exhibited by a barcode) and/or can be otherwise correlated by any suitable technique to the financial instrument. In various aspects, the entity can present the financial instrument to a computerized financial instrument scanning system (e.g., a credit card reader, a barcode scanner) during the transaction. In various cases, the computerized financial instrument scanning system can extract the payment information by scanning the financial instrument (e.g., scanning the magstripe on a credit card, communicating with the microchip on a credit card, optically scanning a barcode) and can store the extracted payment information in a local computerized memory and/or database. In various instances, the computerized financial instrument scanning system can also store in the local computerized memory and/or database contextual information characterizing the transaction (e.g., time and/or date on which the transaction occurred, monetary amount charged and/or involved in the transaction). In various cases, the local computerized memory and/or database can have a set of data entries (e.g., a set of authentication/authorization data slots), wherein each data entry respectively corresponds to a transaction that is recorded and/or facilitated by the computerized financial instrument scanning system. In various instances, a data entry can list the stored metadata (e.g., payment information and/or contextual information) of its respectively corresponding transaction. Conventionally, the computerized financial instrument scanning system can periodically and/or aperiodically synchronize with a network for facilitate processing and/or settlement of the transaction. That is, in various cases, the computerized financial instrument scanning system can transmit (e.g., via any suitable wired and/or wireless electronic connection) a transaction information payload (e.g., a transaction data packet) to the network, where the transaction information payload contains the set of data entries stored in the computerized memory and/or database. After synchronization, the computerized financial instrument scanning system can discard, delete, and/or empty the set of data entries in the computerized memory and/or database, thereby freeing memory/storage space for the metadata of future transactions (e.g., the computerized financial instrument scanning system can have a finite number of data entries, meaning that it can store metadata for a finite number of transactions before having to synchronize with the network). Upon receiving the transaction information payload, the network can process and/or settle the transactions whose metadata are indicated in the transaction information payload.

As recognized by the inventor of various embodiments of the subject innovation, when conventional techniques are employed, the computerized financial instrument scanning system can waste storage space in the computerized memory and/or database. In other words, conventional techniques can result in suboptimal use of a valuable computing resource. Specifically, suppose that a customer having a financial instrument engages in multiple transactions with the same computerized financial instrument scanning system, and suppose that the multiple transactions occur before the computerized financial instrument scanning system synchronizes with the network (e.g., one customer might visit the same store multiple times in one day and might use the same credit card for each of the multiple visits). Conventionally, for each of those multiple transactions, the computerized financial instrument scanning system can scan the financial instrument of the customer to extract payment information of the customer, can track/record contextual information of the given transaction, and can locally store the payment information and the contextual information in a data entry of the computerized memory and/or database, where the data entry respectively corresponds to the given transaction. The result can be that multiple data entries in the computerized memory and/or database are consumed to store the metadata (e.g., the payment information and/or the contextual information) of the multiple transactions. Although the contextual information (e.g., time/date of transaction, amount charged in transaction) can be different across the multiple transactions, the payment information across the multiple transactions can be the same since the same customer used the same financial instrument in the multiple transactions. In other words, even though the contextual information stored in each of the multiple data entries can be different, the payment information stored in each of the multiple data entries can be the same. Thus, when conventional techniques are implemented, the payment information of the customer can be redundantly stored multiple times in the computerized memory and/or database of the computerized financial instrument scanning system. Such redundant storage of the payment information can constitute a waste of memory/storage space. Since memory/storage space can be an important computing resource, systems and/or techniques for ameliorating this conventional waste of memory/storage space can be desirable.

Similarly, as recognized by the inventor of various embodiments of the subject innovation, when conventional techniques are applied, computerized payment processing systems can waste computing resources through the transmission and/or reception of suboptimal transaction information payloads. Specifically, suppose that a particular customer engages in a transaction with the computerized financial instrument scanning system, and suppose that the processing/settlement network already possesses the payment information (e.g., credit card number, bank account number, gift card number) of the particular customer (e.g., in some cases, the network can have obtained such payment information from a previous transaction information payload transmitted by the computerized financial instrument scanning system). Conventionally, the computerized financial instrument scanning system can scan the financial instrument of the particular customer during the transaction to extract the payment information, can track/record contextual information of the transaction, can store both the payment information and the contextual information in the computerized memory and/or database, and can subsequently transmit a transaction information payload to a computerized payment processor which can relay the transaction information payload to a computerized transaction settlement system, where the transaction information payload contains both the payment information and the contextual information. Although inclusion of the contextual information in the transaction information payload can be necessary and/or non-redundant since the computerized transaction settlement system does not already know the contextual information of the transaction, the inclusion of the payment information in the transaction information payload can be unnecessary and/or redundant since the computerized payment processor and/or the computerized transaction settlement system already knows the payment information of the particular customer. In other words, when conventional techniques are implemented, the transaction information payload can be larger than required, which can waste computing resources and/or which can increase processing/settlement times. Systems and/or techniques for ameliorating such wasted computing resources and/or such increased processing times can be desirable.

Various embodiments of the subject innovation can address one or more of these technical problems. One or more embodiments described herein include systems, computer-implemented methods, apparatus, and/or computer program products that can facilitate implementation of child tokens for improved transaction data storage and/or that can facilitate implementation of reduced transaction information payloads based on transaction predictions for quicker computerized payment processing. In other words, various embodiments of the subject innovation can help to reduce an amount of wasted memory/storage space consumed by a computerized financial instrument scanning system, and various embodiments of the subject innovation can help to reduce a size of transaction information payloads received by a computerized transaction settlement system.

As mentioned above, suppose that an entity (e.g., a buyer, consumer, and/or customer, whether human or otherwise) has a financial instrument (e.g., a credit card, a debit card, a gift card, an electronically-displayed and/or printed barcode) which corresponds to payment information (e.g., credit card number, bank account number, customer loyalty number, gift card number) of the entity. In various aspects, the entity can pay for a current transaction by presenting the financial instrument to a computerized financial instrument scanning system, the computerized financial instrument scanning system can transmit a transaction information payload corresponding to the current transaction to a computerized payment processing system that performs various functions as described herein, and the computerized payment processing system can forward the transaction information payload to a computerized transaction settlement system for processing/settlement.

In various embodiments, the computerized financial instrument scanning system can include a scanner component, a context component, a logging component, and/or a token component. In various aspects, the scanner component can electronically, magnetically, optically, and/or otherwise scan the financial instrument during the current transaction, thereby extracting the payment information of the entity. For instance, if the financial instrument is a credit/debit card, the scanner component can be any suitable card reader device in which the credit/debit card can be swiped and/or inserted, and which can, via the swipe and/or insertion, extract and/or interpret payment information that is encoded on/within (and/or that is otherwise correlated to) a magstripe and/or microchip of the credit/debit card. As another example, if the financial instrument is a barcode (e.g., an electronically-generated quick response code that is displayed on a smart phone of the customer), the scanner component can be any suitable optical scanner and/or imaging device which can optically sense the visual patterns exhibited by the barcode, and which can, via the optical sensing, extract and/or interpret the payment information that is encoded within (and/or otherwise correlated to) the visual patterns of the barcode.

In various instances, the context component can collect, track, and/or record contextual information corresponding to the current transaction. In various aspects, such contextual information can be any suitable type of information that characterizes the current transaction (e.g., time and/or date at which the current transaction is occurring, monetary amount that is charged during the current transaction, geo-location and/or address of the current transaction, identifier and/or name of the merchant/vendor that is facilitating the current transaction). In various cases, the context component can comprise any suitable computer hardware, computer software, and/or combination of hardware and software so as to collect, track, and/or record such contextual information (e.g., the computerized financial instrument scanning system can include an electronic clock, timer, and/or calendar that can track the date and/or time of a transaction; the computerized financial instrument scanning system can scan, via the scanning component, price tags and/or universal product codes in order to determine the monetary amount to be charged in a transaction; the computerized financial instrument scanning system can comprise global-positioning devices that can track the geo-location of itself and thus of a transaction). In some cases, such contextual information can be electronically inputted into the context component by an owner and/or operator of the computerized financial instrument scanning system and/or can be electronically retrieved by the context component from any suitable database and/or data structure that is accessible to the context component (e.g., the context component can be programmed to already know its own geo-location and thus the geo-location at which the current transaction is occurring, the context component can be programmed to already know the identifier and/or name of the merchant/vendor facilitating the current transaction since the merchant/vendor can be the owner/operator of the computerized financial instrument scanning system).

In various cases, the logging component can electronically store, in a set of data entries, metadata (e.g., payment information and/or contextual information) of a set of previous transactions that were facilitated by the computerized financial instrument scanning system, where the set of data entries respectively correspond to the set of previous transactions (e.g., one data entry for each previous transaction). In various aspects, the logging component can comprise any suitable computerized database and/or data structure that can store and/or maintain such data entries (e.g., relational database, graph database, hybrid database). In various embodiments, the logging component can query the set of data entries to determine whether the payment information extracted by the scanner component is already stored in the logging component. In other words, the logging component can search through the set of data entries to find an existing data entry that lists payment information which matches and/or corresponds to the payment information extracted by the scanner component. If the logging component does not find an existing data entry that lists payment information that matches and/or corresponds to the payment information extracted by the scanner component during the current transaction, it can be determined and/or inferred that the financial instrument (and thus the entity) of the current transaction was not involved in a previous transaction with the computerized financial instrument scanning system after the most recent syncing between the computerized financial instrument scanning system and the computerized payment processing system. In such case, the payment information extracted by the scanning component during the current transaction can be not already stored in the logging component. Accordingly, the logging component can store the payment information extracted by the scanner component during the current transaction and the contextual information tracked by the context component during the current transaction in a new and/or available data entry now corresponding to the current transaction. On the other hand, if the logging component finds an existing data entry that lists payment information that matches and/or corresponds to the payment information extracted by the scanner component during the current transaction, it can be determined and/or inferred that the financial instrument (and thus the entity) of the current transaction was involved in a previous transaction with the computerized financial instrument scanning system after the most recent syncing between the computerized financial instrument scanning system and the computerized payment processing system. In such case, the payment information extracted by the scanning component during the current transaction can be already stored in the logging component. Accordingly, to avoid redundant storage of the payment information extracted by the scanner component, the logging component can invoke the token component. However, the logging component can nevertheless store the contextual information tracked by the context component during the current transaction in a new and/or available data entry now corresponding to the current transaction.

In various aspects, the token component, once invoked, can write to the new and/or available data entry an electronic token rather than writing to the new and/or available data entry the payment information extracted by the scanner component during the current transaction. In various cases, the electronic token can reference and/or identify the existing data entry that lists payment information that matches and/or corresponds to the payment information extracted by the scanner component during the current transaction. In other words, the token component can, in various embodiments, store in the computerized memory and/or database the electronic token instead of redundantly storing in the computerized memory and/or database the payment information extracted during the current transaction. In various cases, the electronic token can indicate that the current transaction involves the same payment information that is already listed in the existing data entry (e.g., can indicate that the new and/or available data entry is a child of the existing data entry, and/or that the existing data entry is a parent of the new and/or available data entry, since they both involve the same payment information). Thus, by storing the electronic token in the new and/or available data entry, the token component can leverage and/or make use of the already-stored payment information listed in the existing data entry that matches and/or corresponds to the payment information extracted during the current transaction. This can help to avoid wasting memory/storage space at the computerized financial instrument scanning system.

For example, suppose that the computerized financial instrument scanning system has facilitated 35 previous transactions since last syncing with the computerized payment processing system. Thus, the computerized memory and/or database of the computerized financial instrument scanning system can have 35 existing data entries respectively corresponding to the 35 previous transactions. As explained above, an existing data entry can store metadata (e.g., payment information and/or contextual information) of its respectively corresponding previous transaction. Suppose that the computerized financial instrument scanning system facilitates a $36^{th}$ transaction with customer A, and suppose that customer A did not engage with the computerized financial instrument scanning system in any of the 35 previous transactions. In various aspects, the scanning component can scan the financial instrument of the customer A thereby extracting payment information of the customer A, and the context component can track/record contextual information of the $36^{th}$ transaction (e.g., time of the $36^{th}$ transaction, amount charged in the $36^{th}$ transaction). In various cases, the logging component can search through the 35 existing data entries to see if the payment information of the customer A is already stored from a previous transaction. In various instances, the logging component can determine that no payment information in any of the 35 existing data entries matches and/or corresponds to the payment information of the customer A, since the customer A did not engage with the computerized financial instrument scanning system in any of the 35 previous transactions. Accordingly, the logging component can determine that the payment information of the customer A is not already stored, and the logging component can accordingly store both the payment information of the customer A and the contextual information of the $36^{th}$ transaction in a $36^{th}$ data entry of the computerized memory and/or database.

Now, suppose that the computerized transaction system facilitates a $37^{th}$ transaction with a customer B, and suppose that the customer B did engage with the computerized financial instrument scanning system in the $19^{th}$ previous transaction. In various aspects, the scanning component can scan the financial instrument of the customer B thereby extracting payment information of the customer B, and the context component can track/record contextual information of the $37^{th}$ transaction (e.g., time of the $37^{th}$ transaction, amount charged in the $37^{th}$ transaction). In various cases, the logging component can search through the 36 existing data entries to see if the payment information of the customer B is already stored from a previous transaction. In various instances, the logging component can determine that the payment information in the $19^{th}$ existing data entry matches and/or corresponds to the payment information of the customer B, since the customer B engaged with the computerized financial instrument scanning system during the $19^{th}$ previous transaction (e.g., since the payment information stored in the $19^{th}$ existing data entry matches and/or corresponds to the payment information extracted during the $37^{th}$ transaction, it can be determined that the customer B used the same financial instrument in both the $19^{th}$ transaction and the $37^{th}$ transaction). Accordingly, the logging component can determine that the payment information of the customer B is already stored, can accordingly store the contextual information of the $37^{th}$ transaction in a $37^{th}$ data entry of the computerized memory and/or database, can refrain from storing the payment information of the customer B in the $37^{th}$ data entry, and can invoke the token component. In various aspects, the token component can then store in the $37^{th}$ data entry an electronic token that refers to and/or references the $19^{th}$ existing data entry (e.g., the electronic token can indicate that the payment information of the $37^{th}$ transaction is the same as the payment information of the $19^{th}$ transaction). In other words, the electronic token can indicate that the payment information listed in the $19^{th}$ data entry should be reused for the $37^{th}$ data entry. Since the electronic token can be stored in the $37^{th}$ data entry and since the payment information of the customer B can be not stored in the $37^{th}$ data entry, redundant and/or duplicative storage of the payment information of the customer B can be avoided, which can save memory/storage space.

In various embodiments, the computerized payment processing system can include a reference identifier database, a prediction component, a transmitter component, and a receiver component. In various aspects, the reference identifier database can electronically store a set of reference identifiers, and the set of reference identifiers can respectively correspond to and/or be mapped to a set of customers and/or a set of payment information. That is, the reference identifier database can, in some embodiments, correlate the set of reference identifiers to the set of customers and/or to the set of payment information (e.g., each particular customer can be associated with particular payment information and can be associated with a particular reference identifier). In various aspects, the reference identifier database can comprise any suitable computerized database and/or data structure that can store and/or maintain such reference identifiers (e.g., relational database, graph database, hybrid database).

In various embodiments, the prediction component can predict, by executing a trained machine learning classifier, a customer from the set of customers whose information is stored in the reference identifier database that is likely to engage in a future transaction within a threshold period of time (e.g., within the next 24 hours, within the next 12 hours, within the next week, and/or within any other suitable period of time). In various aspects, the prediction can be at any suitable level of generality and/or granularity. For instance, the prediction component can, in some embodiments, predict that a customer is likely to transact in general, regardless of the merchant with whom the customer is likely to transact, regardless of the location at which the customer is likely to transaction, and/or regardless of the products/services which the customer is likely to procure (e.g., the prediction component can predict that a customer is likely to transact but can refrain from predicting the associated merchant, the associated location, and/or the associated product/service). In other embodiments, the prediction component can predict that a customer is likely to transact with a particular merchant at a particular location. In various instances, the trained machine learning classifier can be any suitable machine learning model and/or algorithm that can receive input data of any suitable dimensionality (e.g., scalars, vectors, matrices, tensors) and that can produce as output a result of any suitable dimensionality (e.g., a scalar, a vector, a matrix, a tensor). In various cases, the outputted result of the trained machine learning classifier can indicate a probability that a certain customer will transact in the future (e.g., that the customer is likely to transact in general and/or that the customer is likely to transact at a particular merchant/location for a particular product/service). In various cases, if a general prediction is sought, the inputted data can be any suitable input information pertaining to the customer, such as purchasing history of the customer, electronic browsing history of the customer, product/service preferences of the customer, demographics of the customer, current location of the customer, online shopping carts of the customer, online wish lists of the customer, and/or any other suitable information. In various cases, if a more granular prediction is sought, the inputted data can include any suitable input information pertaining to the customer (e.g., purchasing history, browsing history, product/service preferences, demographics, current location, online shopping carts, online wish lists) and/or can include any suitable information pertaining to a particular merchant/location (e.g., previous transactions between the customer and the merchant, the customer's online consumption of the merchant's marketing material, the customer's online interaction with the merchant's website, the merchant's business hours, the merchant's location, the merchant's current stock/inventory, the merchant's inventory replenishing schedule). In various aspects, such input data can be obtained by the prediction component and/or provided to the trained machine learning classifier via any suitable technique (e.g., such input information can already be stored in the reference identifier database via preprogramming, the prediction component can retrieve such input information from any other suitable databases and/or data structures which are electronically accessible to the prediction component, and/or the such input information can be inputted into the prediction component). Overall, the prediction component can identify a customer (and/or multiple customers) that is likely to transact (e.g., either generally and/or at a specific merchant/location) within a threshold period of time.

In various embodiments, the transmitter component can transmit to the computerized transaction settlement system an instruction/command which can cause the computerized transaction settlement system to queue and/or cache payment information from the set of payment information that corresponds to the predicted customer. In some cases, the reference identifier database can locate the payment information corresponding to the predicted customer in the set of payment information, and the transmitter component can transmit such payment information to the computerized transaction settlement system along with the instruction/command. In other words, the prediction component can predict a customer that is likely to engage in a future transaction, and the transmitter component can cause the computerized transaction settlement system to preemptively queue/cache the payment information of that predicted customer in preparation to process/settle the future transaction. In various aspects, the transmitter component can be any suitable combination of hardware and/or software that can facilitate electronic transmission of data via any suitable wired and/or wireless electronic connection (e.g., transmitter, transceiver).

In various embodiments in which a specific and/or granular prediction is generated by the prediction component (e.g., that a customer is likely to transact at a particular merchant/location), the transmitter component can transmit to the computerized financial instrument scanning system (which can be owned/operated by the predicted merchant and/or which can be located at the predicted location) a reference identifier from the set of reference identifiers that corresponds to the predicted customer. In other words, when the prediction component predicts that a particular customer is likely to engage in a future transaction with a particular merchant and/or at a particular location, the transmitter component can transmit to a computerized financial instrument scanning system owned/operated by that particular merchant and/or located at that particular location a reference identifier corresponding to the predicted customer. Accordingly, the computerized financial instrument scanning system of the particular merchant and/or at the particular location can be notified of the identity of the predicted customer and can thus be on the lookout for financial instruments of the predicted customer.

In such cases where the transmitter component transmits to the computerized financial instrument scanning system the reference identifier corresponding to the predicted customer, the receiver component can receive from the computerized financial instrument scanning system a reduced transaction information payload corresponding to the reference identifier (e.g., corresponding to the predicted customer). In various instances, the computerized financial instrument scanning system can interpret the reference identifier corresponding to the predicted customer as an instruction/command to generate a reduced transaction information payload when a financial instrument of the predicted customer is detected/swiped. The computerized financial instrument scanning system can generate the reduced transaction information payload after scanning a financial instrument having payment information that corresponds to the reference identifier of the predicted customer. In various aspects, the reduced transaction information payload can be a data packet that includes contextual information corresponding to a transaction engaged in by the predicted customer (e.g., time of the transaction, amount charged in the transaction) and that excludes payment information corresponding to the predicted customer (e.g., that does not include the credit card number of the predict customer and/or the bank account number of the predicted customer). In various aspects, as explained above, the reference identifier database can already store and/or know the payment information of the predicted customer. Thus, there can be no need for the computerized financial instrument scanning system to collect and/or transmit the payment information of the predicted customer (e.g., since the reference identifier database already stores the payment information of the predicted customer, the computerized financial instrument scanning system would be redundantly expending computing resources by collecting and/or transmitting the payment information of the predicted customer to the receiver component). Accordingly, the computerized financial instrument scanning system can collect and/or locally store contextual information (e.g., time and/or amount) of the transaction involving the predicted customer and can refrain from collecting and/or locally storing the payment information of the predicted customer (e.g., in some cases, the computerized financial instrument scanning system can locally store an electronic token, as described above, rather than storing the payment information of the predicted customer). Accordingly, the computerized financial instrument scanning system can transmit to the receiver component the reduced transaction information payload (e.g., containing the contextual information of the transaction involving the predicted customer and not containing the payment information of the predicted customer). In various aspects, the reduced transaction information payload can consume fewer computing resources than can a full-size and/or unreduced transaction information payload (e.g., not collecting/transmitting the payment information of the predicted customer can result in lower computing resource consumption than can collecting/transmitting the payment information of the predicted customer). In various cases, the transmitter component can then transmit the reduced transaction information payload to the computerized transaction settlement system so that settlement can be completed. Since the payment information of the predicted customer can be already queued/cached at the computerized transaction settlement system, settlement can performed and/or facilitated more quickly.

For example, suppose that the prediction component analyzes, via the trained machine learning classifier, input data pertaining to a customer C and a merchant D (e.g., purchasing history of the customer C, online browsing history of the customer C, product/service preferences of the customer C, demographics of the customer C, customer C's online shopping carts, customer C's online wish lists, customer C's consumption of merchant D's marketing material/advertisements/emails, customer C's interactions with merchant D's website and/or mobile application, merchant D's inventory, merchant D's location), and predicts based on such analysis that the customer C is likely to transact with the merchant D (at merchant D's location) within the next 24 hours. In various cases, the reference identifier database can locate within its entries payment information of the customer C (e.g., credit/debit card number of the customer C, bank account number of the customer C), and the transmitter component can transmit an instruction to the computerized transaction settlement system to queue and/or cache the payment information of the customer C (e.g., in some cases, since the merchant D is predicted, known information pertaining to the merchant D can also be transmitted to and/or retrieved by the computerized transaction settlement system for queuing/caching, such as an identifier corresponding to the merchant D, an address associated with the merchant D, a device identifier corresponding to a computerized financial instrument scanning system owned/operated by the merchant D, and/or so on). Moreover, in various aspects, the reference identifier database can locate within its entries a reference identifier that corresponds to the customer C, and can transmit the reference identifier corresponding to the customer C to a computerized financial instrument scanning system owned/operated by the merchant D. In various cases, when the customer C engages in a transaction with the merchant D (e.g., when a financial instrument corresponding to the reference identifier of the customer C is scanned by the computerized financial instrument scanning system owned/operated by the merchant D), the computerized financial instrument scanning system owned/operated by the merchant D can collect/store the time of the transaction and/or the amount of the transaction, and can refrain from collecting/storing the payment information of the customer C. Accordingly, the computerized financial instrument scanning system owned/operated by the merchant D can transmit to the receiver component a reduced transaction information payload that includes the time of the transaction and/or the amount of the transaction, and that excludes the payment information of the customer C (e.g., in some cases, if known information regarding the merchant D is already queued/cached by the computerized transaction settlement system, the reduced transaction information payload can likewise exclude such known information; however, if such information is not already queued/cached by the computerized transaction settlement system, such information can be included in the reduced transaction information payload). In various instances, the transmitter component can then transmit and/or forward the reduced transaction information payload to the computerized transaction settlement system for settlement (e.g., settlement can take less time since the payment information of the customer C can be queued/cached).

In various other embodiments in which a generic and/or non-specific prediction is generated by the prediction component (e.g., that a customer is likely to transact in general, without predicting a specific merchant/location at which the customer is likely to transact), the transmitter component can refrain from transmitting to any computerized financial instrument scanning system a reference identifier from the set of reference identifiers that corresponds to the predicted customer. Instead, the receiver component can receive from a computerized financial instrument scanning system a reduced transaction information payload (e.g., including contextual information and excluding payment information) that includes a reference identifier. In various aspects, the reference identifier database can compare the reference identifier included in the reduced transaction information payload with a reference identifier from the set of reference identifiers that corresponds to the predicted customer. If the reference identifier database determines that the reference identifier included in the reduced transaction information payload matches and/or corresponds to the reference identifier of the predicted customer, the transmitter component can transmit and/or forward the reduced transaction information payload to the computerized transaction settlement system (e.g., the reference identifier database can determine that the reduced transaction information payload characterizes a transaction engaged in by the predicted customer, and the transmitter component can forward the reduced transaction information payload to the computerized transaction settlement system for settlement since the payment information of the predicted customer is queued/cached). On the other hand, if the reference identifier database determines that the reference identifier included in the reduced transaction information payload does not match and/or correspond to the reference identifier of the predicted customer, the reference identifier database can search its entries for payment information that corresponds to the reference identifier included in the reduced transaction information payload (e.g., the reference identifier database can determine that the reduced transaction information payload characterizes a transaction engaged in by a customer other than the predicted customer, and payment information of that non-predicted customer can be searched for in the reference identifier database). In various instances, the transmitter component can then transmit both the reduced transaction information payload and the payment information corresponding to the reference identifier included in the reduced transaction information payload to the computerized transaction settlement system for settlement (e.g., since the reference identifier included in the reduced transaction information payload can correspond to a non-predicted customer, and since the payment information of that non-predicted customer can be not yet queued/cached at the computerized transaction settlement system, the reference identifier database can locate the payment information of that non-predicted customer, and the transmitter component can supplement the reduced transaction information payload with such payment information).

For example, suppose that the prediction component analyzes, via the trained machine learning classifier, input data pertaining to a customer E (e.g., purchasing history of the customer E, online browsing history of the customer E, product/service preferences of the customer E, demographics of the customer E, online shopping carts of the customer E, online wish lists of the customer E), and predicts based on such analysis that the customer E is likely to transact within the next 36 hours. In various cases, the transmitter component can locate within the reference identifier database payment information of the customer E (e.g., credit/debit card number of the customer E, bank account number of the customer E), and can transmit an instruction to the computerized transaction settlement system to queue and/or cache the payment information of the customer E. In various instances, a computerized financial instrument scanning system can transmit to the receiver component a reduced transaction information payload that includes the time of a transaction and/or the amount of the transaction, and that includes a reference identifier. In various instances, the reference identifier database can determine a reference identifier from the set of reference identifiers that corresponds to the customer E, and can compare the reference identifier corresponding to the customer E with the reference identifier included in the reduced transaction information payload. In various cases, the reference identifier database can determine that the reference identifier included in the reduced transaction information payload does not match and/or correspond to the reference identifier of the customer E. Accordingly, the reference identifier database can search its entries to determine an identity of the customer that corresponds to the reference identifier included in the reduced transaction information payload. Suppose that the reference identifier database determines that the reference identifier included in the reduced transaction information payload corresponds to a customer F. The reference identifier database can thus locate and/or determine the payment information of the customer F (e.g., which can be already stored in the reference identifier database), and the transmitter component can transmit both the reduced transaction information payload and the payment information of the customer F to the computerized transaction settlement system for settlement (e.g., since the payment information of the customer F can be neither queued/cached at the computerized transaction settlement system nor included in the reduced transaction information payload, the transmitter component can supplement the reduced transaction information payload with the payment information of the customer F). In various cases, on the other hand, if the reference identifier included in the reduced transaction information payload does match and/or correspond to the reference identifier of the customer E, the transmitter component can simply forward the reduced transaction information payload to the computerized transaction settlement system for settlement (e.g., the payment information of the customer E can be queued/cached at the computerized transaction settlement system, and so the transmitter component need not append any other payment information to the reduced transaction information payload). In various aspects, the reduced transaction information payload and the queuing/caching of partial information at the computerized transaction settlement system can result in faster transaction settlements.

In various embodiments, the computerized payment processing system can transmit an instruction to the computerized transaction settlement system that causes the computerized transaction settlement system to dequeue and/or un-cache the queued/cached payment information (and/or any suitable subset of the queued/cached payment information). In various aspects, such dequeuing and/or un-caching can be based on any suitable triggering criteria. For example, in some embodiments, the prediction component can include a second trained machine learning classifier that can be trained to predict a likelihood of success/failure of a predicted transaction (e.g., can predict that a predicted transaction is likely to default due to bad credit, due to insufficient funds, due to risky customer behavior/history). In various aspects, such a trained machine learning classifier can receive as input any suitable information related to the predicted customer (e.g., credit spending limit, bank account balance, product/service price, customer's history of defaults, customer's criminal history) and/or any suitable information related to a predicted merchant (e.g., merchant history of failed transactions, merchant inventory depletions). If the prediction component infers that a predicted transaction is likely to fail, the transmitter component can instruct the computerized transaction settlement system to dequeue and/or un-cache the payment information of the predicted customer. As another example, in some embodiments, the prediction component can track whether or not the threshold period of time in which the predicted customers is predicted to transact has elapsed. If the threshold period of time has elapsed/expired, the transmitter component can instruct the computerized transaction settlement system to dequeue and/or un-cache the payment information of the predicted customer. In various aspects, any other suitable dequeuing and/or un-caching trigger can be implemented (e.g., machine learning models can generate risk scores that can be used as dequeuing and/or un-caching criteria).

In various embodiments, the prediction component can predict multiple customers that are likely to transact (e.g., either specifically and/or generally), and the transmitter component can instruct the computerized transaction settlement system to queue and/or cache payment information corresponding to the multiple predicted customers. In some cases, the transmitter component can further instruct the computerized transaction settlement system to apply and/or assign a dynamic priority to the payment information of each of the multiple predicted customers. In various cases, such dynamic priority can be based on likelihood of occurrence, such that a transaction that has a high likelihood of occurrence has a higher priority than a transaction that has an intermediate likelihood of occurrence (e.g., a predicted transaction that is 89% likely to occur according to the prediction component can be assigned a higher priority level than a predicted transaction that is 85% likely to occur according to the prediction component). In various aspects, any other suitable technique of assigning dynamic priority levels can be implemented (e.g., assigning priority based on likelihood of success/failure/default/risk). In various aspects, the dynamic priority assignments can be used to determine an order of dequeuing (e.g., lower priority transactions can be dequeued/un-cached first) and/or can be used to determine a level of computing resource distribution (e.g., high priority transactions can be allotted more computing resources).

In various other embodiments, the computerized payment processing system can provide a set and/or list of reference identifiers to the computerized financial instrument scanning system (e.g., the set and/or list of reference identifiers can correspond to a set and/or list of predicted and/or likely-to-transact customers). In various aspects, the set and/or list of reference identifiers can be correlated and/or mapped to a corresponding set and/or list of financial instruments. In various instances, when the computerized financial instrument scanning system encounters (e.g., swipes and/or scans) a particular financial instrument that is included in the set and/or list of financial instruments, the computerized financial instrument scanning system can avoid storing the payment information associated with the particular financial instrument in its local database and/or data structure. Instead, in various aspects, the computerized financial instrument scanning system can store within its local database and/or data structure a token that includes/indicates the particular reference identifier that is correlated and/or mapped to the particular financial instrument. In this way, the computerized financial instrument scanning system can reduce an amount of redundantly-used storage space (e.g., the computerized financial instrument scanning system can store the token rather than storing a plethora of financial instrument information associated with the particular financial instrument). Moreover, in various aspects, the computerized financial instrument scanning system can, during synchronization, send to the computerized payment processing system the token indicating/including the particular reference identifier, and the computerized payment processing system can identify and/or know all other information necessary for transaction processing/settlement based on the particular reference identifier (e.g., the particular reference identifier can already be correlated and/or mapped to particular payment information). In this way, transaction information payloads transmitted from the computerized financial instrument scanning system to the computerized payment processing system can be reduced in size.

Although the herein disclosure discusses various embodiments where each reference identifier in the set of reference identifiers corresponds to, is correlated to, is linked to, and/or is mapped to a single financial instrument and/or a single user, this is exemplary and non-limiting. In various embodiments, a reference identifier can be correlated to, mapped to, and/or linked to any suitable number of users and/or to any suitable number of financial instruments. In some cases, machine learning algorithms/models can be implemented to determine, infer, and/or predict that two or more financial instruments are associated with each other (e.g., two different credit cards that belong to the same customer) and/or that two or more users are associated with each other (e.g., a first user with a first credit card can be the spouse, parent, and/or child of a second user with a second credit card). In various aspects, the machine learning models/algorithms can make such determinations, inferences, and/or predictions on the basis of any suitable input information (e.g., data indicating that two or more users are family members, data indicating that two or more users share the same residential/shipping address, data indicating that two or more users visit the same merchants, and/or so on). When a particular reference identifier is linked, correlated, and/or mapped to multiple users and/or multiple financial instruments, that particular reference identifier can be stored/cached on the computerized financial instrument scanning system in anticipation of a transaction involving any of the correlated financial instruments and/or users. This can, in various aspects, further reduce an amount of computing resources needed to store, log, and/or process transactions.

Various embodiments of the subject innovation can be employed to use hardware and/or software to solve problems that are highly technical in nature (e.g., to facilitate implementation of child tokens that optimize transaction data storage, and/or to facilitate implementation of reduced transaction payloads based on transaction predictions for quicker computerized transaction processing), that are not abstract and that cannot be performed as a set of mental acts by a human. Further, some of the processes performed can be performed by a specialized computer (e.g., trained machine learning classifier, financial instrument scanner, transmitter/receiver) for carrying out defined tasks related to computerized transaction processing (e.g., extracting financial instrument data by scanning a financial instrument, identifying a first data entry in an electronic transaction log that lists previous financial instrument data that matches and/or corresponds to the extracted financial instrument data, and writing an electronic token to a second data entry in the electronic transaction log that references the first data entry, wherein the electronic token is written instead of the extracted financial instrument data; maintaining a database of a set of reference identifiers that are correlated to a set of users and to a set of financial instrument data, predicting, via a trained machine learning classifier, a user that is likely to transact within a predetermined time frame, transmitting an instruction to a computerized transaction settlement system causing the computerized transaction settlement system to cache financial instrument data of the predicted user, receiving a reduced transaction information payload that corresponds to the predicted user from a financial instrument scanning system, and transmitting the reduced transaction information payload to the computerized transaction settlement system). Such defined tasks are not conventionally performed manually by humans. Indeed, neither the human mind nor a human with pen and paper can electronically scan a financial instrument, electronically maintain a database of reference identifiers, execute a trained machine learning classifier, electronically transmit queuing instructions, or electronically receive/transmit reduced transaction information payloads. Instead, various embodiments of the subject innovation are inherently and inextricably tied to computer technology and cannot be implemented outside of a computing environment (e.g., computerized card readers/scanners cannot exist outside of a computing environment, trained machine learning classifiers cannot exist outside of a computing environment, databases cannot exist outside of a computing environment, computerized caches cannot exist outside of a computing environment).

In various instances, embodiments of the subject innovation can integrate into a practical application the disclosed teachings regarding implementation of child tokens that optimize transaction data storage, and/or regarding implementation of reduced transaction payloads based on transaction predictions for quicker computerized payment processing. Indeed, in various embodiments, the disclosed teachings can provide a computerized financial instrument scanning system (e.g., a card reader/scanner) that can waste less local memory/storage space than can conventional financial instrument scanning systems (e.g., as described herein, the implementation of child tokens can help to avoid redundantly storing financial instrument data that is already stored by a card reader/scanner). Systems/techniques that can reduce an amount of wasted computer memory/storage space certainly constitute practical applications of computers. Moreover, in various embodiments, the disclosed teachings can provide a computerized payment processing system that can predict (e.g., based on machine learning algorithms) that a user is likely to transact in the future, that can instruct a computerized transaction settlement system to queue/cache financial instrument data corresponding to the predicted user, and that can receive a reduced transaction information payload from a computerized financial instrument scanning system that excludes the financial instrument data corresponding to the predicted user (e.g., as described herein, the preemptive queuing/caching and the exclusion of already-stored financial instrument data from transaction information payloads can reduce payment processing/settlement times). Systems/techniques that can reduce computing processing times certainly constitute concrete and tangible technical improvements. Thus, embodiments of the subject innovation constitute useful and practical applications of computers.

It should be appreciated that the herein figures are exemplary and non-limiting.

FIG. 1 illustrates a high-level block diagram of an example, non-limiting system 100 that can facilitate implementation of child tokens for improved transaction data storage and/or implementation of reduced transaction information payloads based on transaction predictions for quicker computerized payment processing in accordance with one or more embodiments described herein.

As shown, the system 100 can comprise a financial instrument 104, which can be owned/operated by an entity 102 and/or which can otherwise correspond to the entity 102. In various aspects, the financial instrument 104 can be any suitable financial instrument which can store payment data (e.g., credit card number, bank account number, gift card number) and/or which can otherwise be correlated with such payment data. For instance, the financial instrument 104 can be any suitable credit card, debit card, gift card, and/or electronically generated and/or printed barcode (e.g., quick response code).

In various embodiments, the system 100 can comprise a financial instrument scanning system 106. In various aspects, the entity 102 can present the financial instrument 104 to the financial instrument scanning system 106 during a transaction. In various cases, the financial instrument scanning system 106 can be any suitable combination of hardware and/or software that can electronically, magnetically, and/or optically scan the financial instrument 104 in order to extract and/or learn the payment data correlated with the financial instrument 104 (e.g., a card reader/scanner for swiping and/or inserting credit/debit cards, an imaging/laser scanner for optically scanning barcodes, a camera for capturing an image of a barcode). As explained herein, the financial instrument scanning system 106 can be designed in such a way so as to reduce an amount of memory/storage space that is wasted by conventional financial instrument scanning systems.

In various embodiments, the system 100 can comprise a transaction settlement system 110. In various aspects, the transaction settlement system 110 can ultimately receive transaction metadata (e.g., payment data, transaction context data) from the financial instrument scanning system 106 and can settle the transactions represented by such metadata. In various aspects, the transaction settlement system 110 can be any suitable network of processors, servers, and/or databases that can settle a transaction by transferring electronic payment and/or funds from one financial account (e.g., an account of the entity 102) to another financial account (e.g., an account of a merchant with whom the entity 102 is transacting).

In various embodiments, as shown, the system 100 can comprise a payment processing system 108. In various instances, the payment processing system 108 can serve as an intermediary between the financial instrument scanning system 106 and the transaction settlement system 110. As described herein, the payment processing system 108 can be designed so as to speed up settlement times of the transaction settlement system 110 as compared to conventional transaction settlement systems. In various aspects, the payment processing system 108 can comprise any suitable combination of hardware and/or software that can facilitate the computerized functionality described herein.

In various aspects, the financial instrument scanning system 106 can have any suitable wired and/or wireless electronic connection with the payment processing system 108, and the payment processing system 108 can have any suitable wired and/or wireless electronic connection with the transaction settlement system 110. Although not explicitly shown in FIG. 1, in some cases, the financial instrument scanning system 106 can have any suitable wired and/or wireless electronic connection with the transaction settlement system 110.

Figure 2:
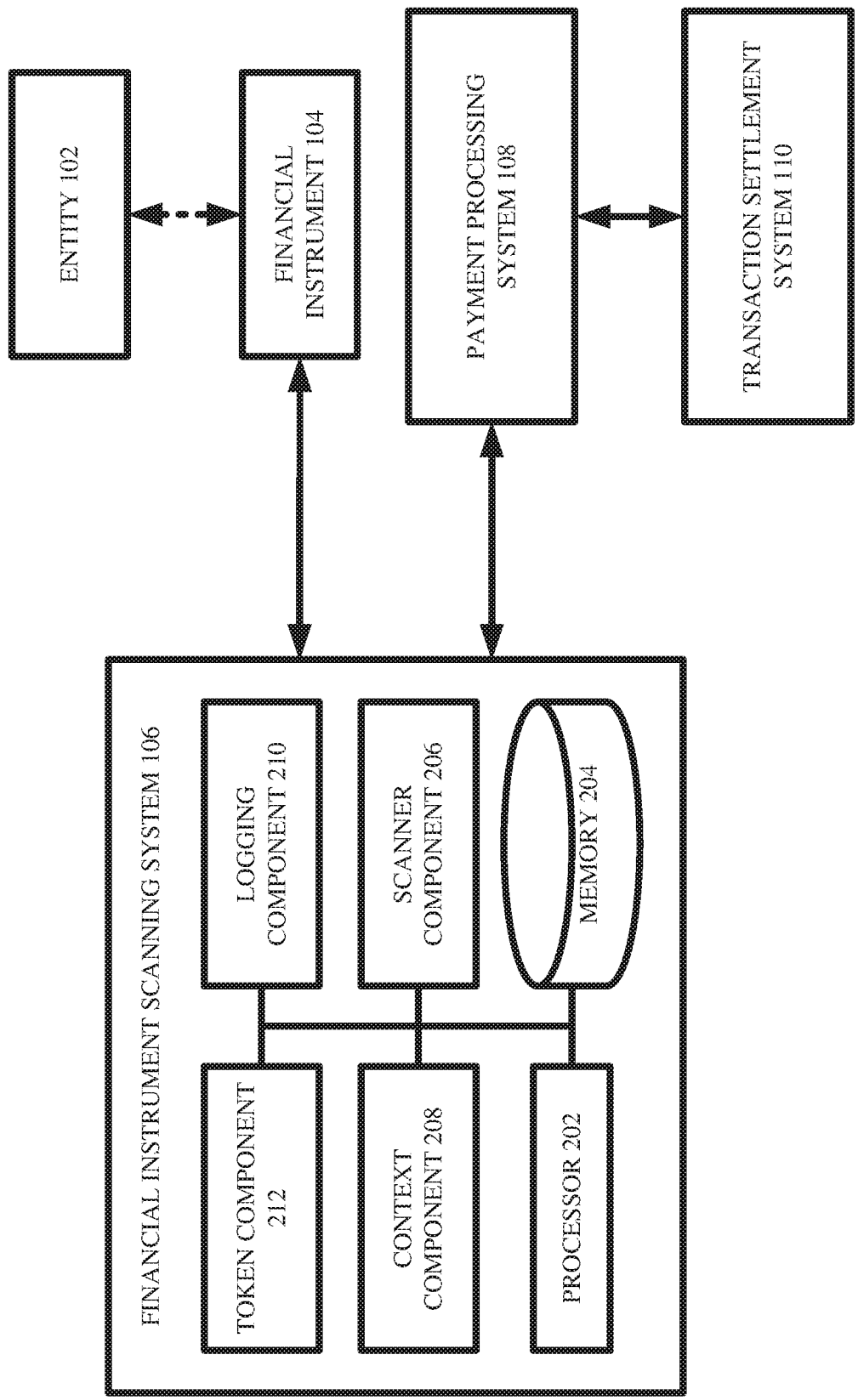
FIG. 2 illustrates a high-level block diagram of an example, non-limiting system that facilitates implementation of child tokens for improved transaction data storage in accordance with one or more embodiments described herein.

FIG. 2 illustrates a high-level block diagram of an example, non-limiting system 200 that can facilitate implementation of child tokens for improved transaction data storage in accordance with one or more embodiments described herein. As shown, FIG. 2 can depict various components of the financial instrument scanning system 106.

In various embodiments, the financial instrument scanning system 106 can comprise a processor 202 (e.g., computer processing unit, microprocessor) and a computer-readable memory 204 that is operably and/or operatively and/or communicatively connected/coupled to the processor 202. The memory 204 can store computer-executable instructions which, upon execution by the processor 202, can cause the processor 202 and/or other components of the financial instrument scanning system 106 (e.g., scanner component 206, context component 208, logging component 210, token component 212) to perform one or more acts. In various embodiments, the memory 204 can store computer-executable components (e.g., scanner component 206, context component 208, logging component 210, token component 212), and the processor 202 can execute the computer-executable components.

In various embodiments, the financial instrument scanning system 106 can comprise a scanner component 206. In various cases, the scanner component 206 can be any suitable combination of hardware and/or software that can electronically, magnetically, and/or optically scan the financial instrument 104 so as to extract payment information associated with the financial instrument 104. For example, the scanner component 206 can be any suitable magstripe reader device (e.g., if the financial instrument 104 has a magstripe that represents payment data, the financial instrument 104 can be swiped through the scanner component 206 to extract the payment data), any suitable microchip reader device (e.g., if the financial instrument 104 has a microchip that stores the payment data, the financial instrument 104 can be inserted into the scanner component 206 to extract the payment data), any laser imaging device (e.g., if the financial instrument 104 has an optical barcode, the financial instrument 104 can be presented and/or displayed to the scanner component 206 to extract the payment data), and/or any suitable camera device (e.g., if the financial instrument 104 has an optical barcode and/or implements any other optical technique for representing information, the financial instrument 104 can be presented and/or displayed to the scanner component 206 to extract the payment data).

In various embodiments, the financial instrument scanning system 106 can comprise a context component 208. In various aspects, the context component 208 can track, record, and/or collect context-based information that characterizes a transaction completed using the financial instrument 104. In various aspects, such context-based information can include time/date at which the transaction occurs (e.g., time/date when the financial instrument 104 is scanned by the scanner component 206), monetary amount charged during the transaction (e.g., the amount of money that is charged to the financial instrument 104), identifier of a merchant facilitating the transaction (e.g., an identifier that corresponds to the merchant with whom the entity 102 is transacting and/or the merchant that owns/operates the financial instrument scanning system 106), geo-location at which the transaction is occurring (e.g., geo-location where the financial instrument 104 is scanned by the scanner component 206), device identifier of the financial instrument scanning system 106 (e.g., an identifier that corresponds to the particular card reader that is scanning the financial instrument 104), and/or so on. In various aspects, the context component 208 can include any suitable combination of hardware and/or software that can track, record, and/or collect such context-based information. For example, in some cases, the context component 208 can include any suitable timing device (e.g., electronic timer, clock, calendar) that can track time of transactions and/or any suitable global positioning device (e.g., global positioning sensors) that can track geo-locations of transactions. In various cases, the context component 208 can be preprogrammed with various context-based information (e.g., the context component 208 can already know a device identifier that corresponds to the financial instrument scanning system 106, can already know a geo-location of the financial instrument scanning system 106, and/or can already know an identifier corresponding to the merchant that owns/operates the financial instrument scanning system 106) and/or can retrieve various context-based information from any suitable database and/or data structure which is accessible to the context component 208. In some cases, the such context-based information can be inputted into the context component 208.

In various embodiments, the financial instrument scanning system 106 can comprise a logging component 210. In various aspects, the logging component 210 can store and/or maintain an electronic transaction log that includes a set of data entries, where each data entry can store and/or list metadata of a respectively corresponding transaction. In various cases, the metadata that is stored in a data entry of the electronic transaction log can include payment data of the data entry's corresponding transaction and/or context-based data of the data entry's corresponding transaction (e.g., a first data entry can list the payment data that was scanned by the scanner component 206 during a first transaction and can list the context-based data that was collected by the context component 208 during the first transaction; a second data entry can list the payment data that was scanned by the scanner component 206 during a second transaction and can list the context-based data that was collected by the context component 208 during the second transaction; and so on). Accordingly, in various aspects, the logging component 210 can comprise any suitable database and/or data structure that can store and/or maintain such an electronic transaction log (e.g., relational database, graph database, hybrid database).

In various instances, the logging component 210 can search through and/or query the electronic transaction log to determine whether the payment data extracted by the scanner component 206 during a current transaction (e.g., the payment data extracted by the scanner component 206 can correspond to the financial instrument 104 which can be presented as payment during a current transaction) is already stored in the electronic transaction log from a previous transaction. That is, in various aspects, the logging component 210 can determine whether there is a previous and/or existing data entry in the electronic transaction log, such that the previous and/or existing data entry lists metadata (e.g., payment data and/or context-based data) of a previous transaction facilitated by the financial instrument scanning system 106, and such that payment data listed in the previous data entry matches and/or corresponds to the payment data extracted by the scanner component 206 during the current transaction (e.g., extracted from the financial instrument 104).

In various aspects, the logging component 210 can determine that no previous and/or existing data entry in the electronic transaction log lists payment data that matches and/or corresponds to the payment data extracted by the scanner component 206 during the current transaction (e.g., extracted from the financial instrument 104). In such case, it can be determined that the payment data of the financial instrument 104 is not already stored in the electronic transaction log. Accordingly, the logging component 210 can store in a new and/or available data entry in the electronic transaction log the payment data extracted by the scanner component 206 during the current transaction (e.g., extracted from the financial instrument 104) and/or the context-based data collected by the context component 208 during the current transaction.

In various other aspects, however, the logging component 210 can determine that a previous and/or existing data entry in the electronic transaction log lists payment data that matches and/or corresponds to the payment data extracted by the scanner component 206 during the current transaction (e.g., extracted from the financial instrument 104). In such case, it can be determined that the payment data of the financial instrument 104 is already stored in the electronic transaction log (e.g., it can be inferred that the financial instrument 104, which is being scanned by the scanner component 206 in the current transaction, was also scanned by the scanner component 206 in the previous transaction). In such case, the logging component 210 can store in a new and/or available data entry in the electronic transaction log the context-based data collected by the context component 208 during the current transaction, and can refrain from storing in the new and/or available data entry the payment data extracted by the scanner component 206 during the current transaction. Rather than storing in the new and/or available data entry the payment data extracted during the current transaction, the logging component 210 can invoke a token component 212.

In various embodiments, the financial instrument scanning system 106 can comprise the token component 212. In various aspects, the token component 212 can, when invoked, store an electronic token in the new and/or available data entry corresponding to the current transaction. In various cases, the electronic token can reference, refer back to, and/or otherwise point to the previous data entry that lists payment data that matches and/or corresponds to the payment data extracted during the current transaction. In various instances, the electronic token can be stored in the new and/or available data entry in place of and/or instead of the payment data extracted during the current transaction. In other words, when the payment data that is extracted during the current transaction is already stored in a previous data entry of the electronic transaction log, an electronic token that references such previous data entry can be stored in the electronic transaction log, rather than redundantly and/or repetitively storing the payment data extracted during the current transaction. In this way, the electronic transaction log can indicate that the payment data for the current transaction is the same as the payment data for a prior transaction. In various aspects, a digital size of the electronic token can be smaller than a digital size of the payment data extracted during the current transaction. Accordingly, by storing the electronic token instead of the payment data extracted during the current transaction, less memory/storage space in the electronic transaction log can be consumed, and pertinent transaction information can be nevertheless preserved since the payment data extracted during the current transaction was already stored within the electronic transaction log (e.g., payment data in a previous data entry can match and/or correspond to the payment data extracted during the current transaction). In this way, implementation of electronic tokens can be used to save local memory/storage space in the financial instrument scanning system 106, which is surely a concrete and tangible technical improvement in the field of computerized payment processing.

Figure 3:
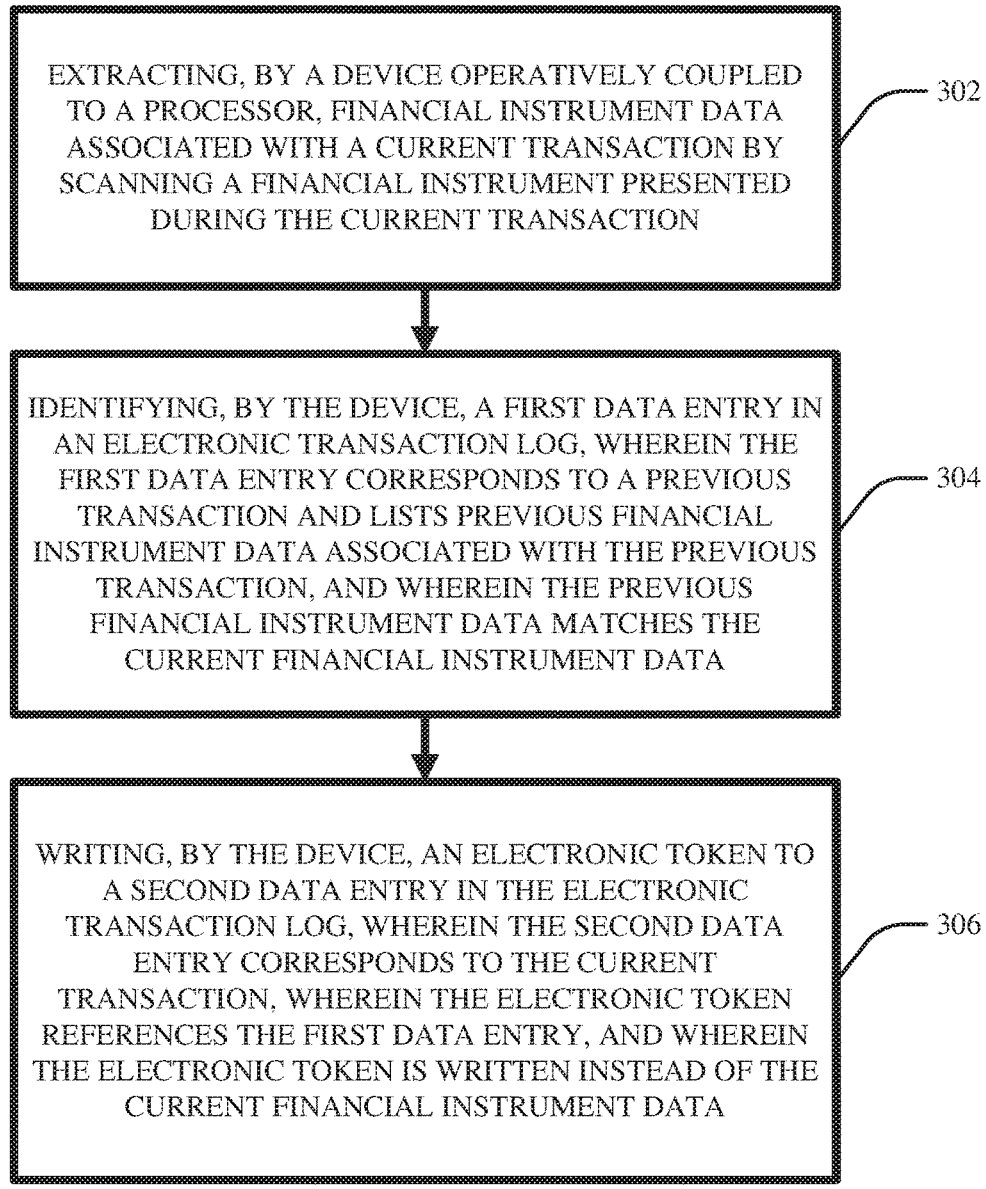
FIG. 3 illustrates a high-level flow diagram of an example, non-limiting computer-implemented method that facilitates implementation of child tokens for improved transaction data storage in accordance with one or more embodiments described herein.

FIG. 3 illustrates a high-level flow diagram of an example, non-limiting computer-implemented method 300 that can facilitate implementation of child tokens for improved transaction data storage in accordance with one or more embodiments described herein. In various aspects, the computer-implemented method 300 can be performed by the system 200.

In various embodiments, act 302 can include extracting, by a device operatively coupled to a processor (e.g., 206), financial instrument data associated with a current transaction by scanning a financial instrument (e.g., 104) presented during the current transaction (e.g., a card reader can scan a credit card to collect payment data associated with the credit card).

In various instances, act 304 can include identifying, by the device (e.g., 210), a first data entry (e.g., a previous data entry) in an electronic transaction log. In various cases, the first data entry can correspond to a previous transaction (e.g., can list metadata of the previous transaction) and can list previous financial instrument data associated with the previous transaction. In various cases, the previous financial instrument data can match and/or correspond to the current financial instrument data.

In various aspects, act 306 can include writing, by the device (e.g., 212), an electronic token to a second data entry (e.g., a new and/or available data entry) in the electronic transaction log. In various cases, the second data entry can correspond to the current transaction. In various cases, the electronic token can reference, refer back to, and/or otherwise point to the first data entry (e.g., the electronic token can indicate that the payment data involved in the current transaction is the same as the payment data involved in the previous transaction). In various cases, the electronic token can be written to the electronic transaction log instead of the current financial instrument data.

Figure 4:
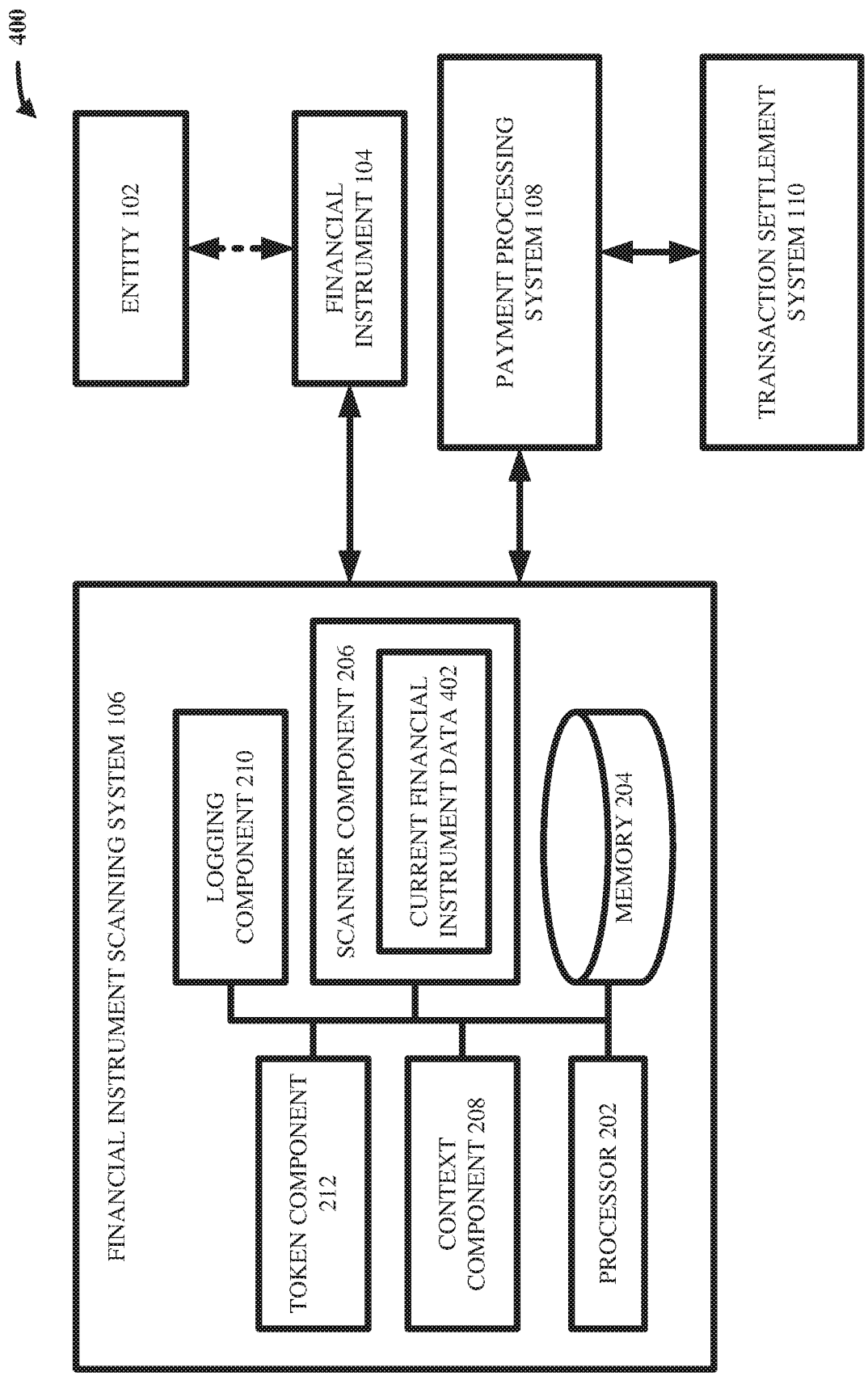
FIG. 4 illustrates a high-level block diagram of an example, non-limiting system including current financial instrument data that facilitates implementation of child tokens for improved transaction data storage in accordance with one or more embodiments described herein.

FIG. 4 illustrates a high-level block diagram of an example, non-limiting system 400 including current financial instrument data that can facilitate implementation of child tokens for improved transaction data storage in accordance with one or more embodiments described herein. As shown, the system 400 can, in various cases, comprise the same components as the system 200, and can further comprise current financial instrument data 402.

As mentioned above, the entity 102 can present the financial instrument 104 to the financial instrument scanning system 106 during a current transaction, and the scanner component 206 can, in various embodiments, implement any suitable technique to scan the financial instrument 104 (e.g., electronic scanning, magnetic scanning, microchip communication, optical scanning). In various aspects, by scanning the financial instrument 104, the scanner component 206 can extract and/or otherwise obtain the current financial instrument data 402. In various cases, the current financial instrument data 402 can be any suitable form of payment information that is encoded/stored in the financial instrument 104 and/or that is otherwise correlated to the financial instrument 104. For instance, in some cases, the financial instrument 104 can be a credit card of the entity 102, and the current financial instrument data 402 can be a credit card number/identifier corresponding to the financial instrument 104. In other cases, the financial instrument 104 can be a debit card of the entity 102, and the current financial instrument data 402 can be a debit card number/identifier corresponding to the financial instrument 104. In still other cases, the financial instrument 104 can be a gift card of the entity 102, and the current financial instrument data 402 can be a gift card number/identifier corresponding to the financial instrument 104. In yet other cases, the financial instrument can be an optical barcode that is presented by the entity 102, and the current financial instrument data 402 can be any suitable payment information that can be represented within and/or otherwise correlated to the optical barcode (e.g., credit card number/identifier, debit card number/identifier, gift card number/identifier, bank account number/identifier).

Figure 5:
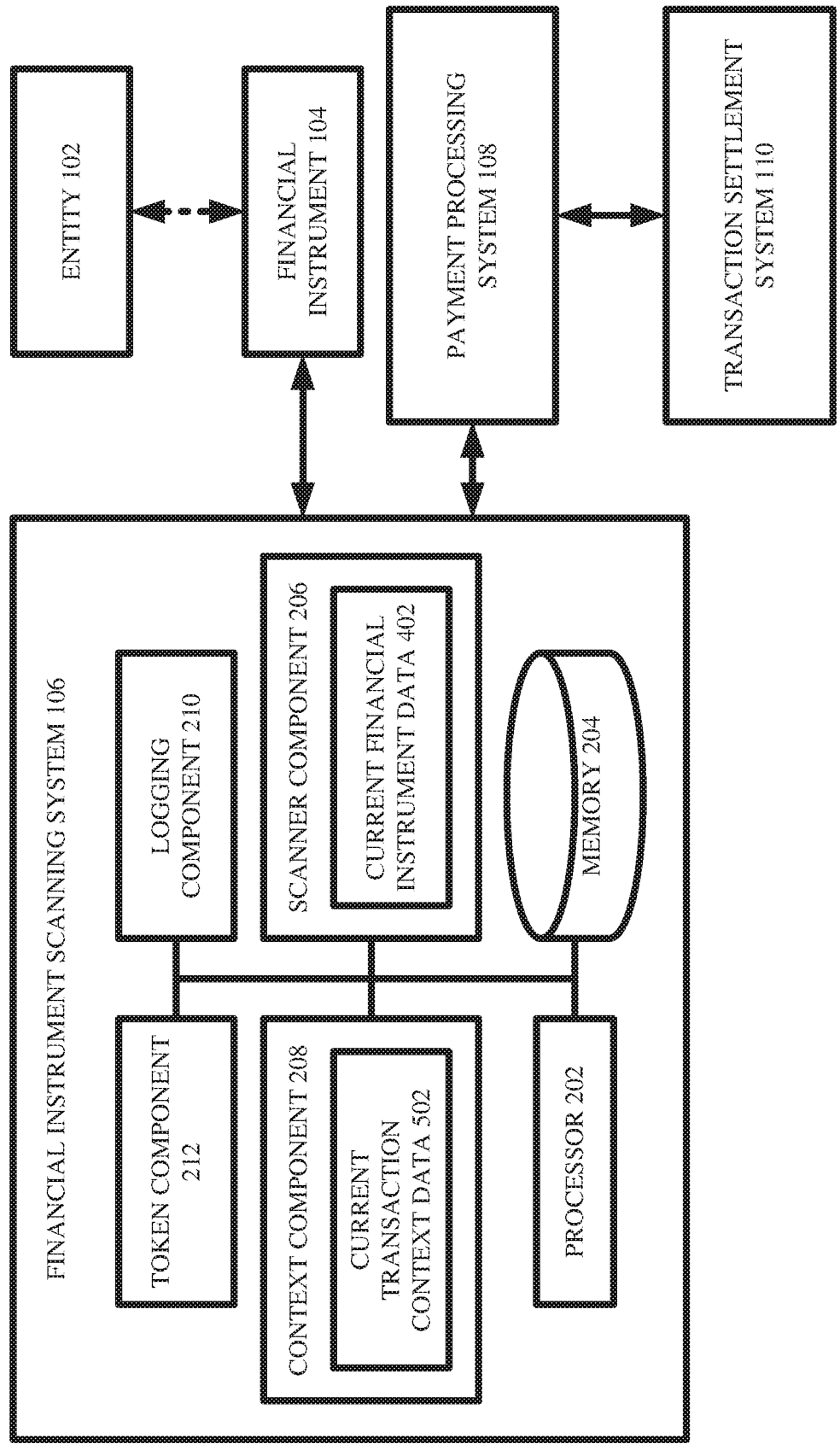
FIG. 5 illustrates a high-level block diagram of an example, non-limiting system including current transaction context data that facilitates implementation of child tokens for improved transaction data storage in accordance with one or more embodiments described herein.

FIG. 5 illustrates a high-level block diagram of an example, non-limiting system 500 including current transaction context data that can facilitate implementation of child tokens for improved transaction data storage in accordance with one or more embodiments described herein. As shown, the system 500 can, in various cases, comprise the same components as the system 400, and can further comprise current transaction context data 502.

As mentioned above, the context component 208 can, in various embodiments, implement any suitable technique to track, record, and/or collect the current transaction context data 502 during the current transaction (e.g., when the scanner component 206 scans the financial instrument 104). In various aspects, the current transaction context data 502 can include any suitable information and/or metadata that characterizes the current transaction. For instance, the current transaction context data 502 can, in some cases, include a time/date of the current transaction (e.g., which can be tracked, recorded, and/or collected via an electronic timer, clock, and/or calendar). As another example, the current transaction context data 502 can, in some cases, include a monetary amount that is being charged to the financial instrument 104 in the current transaction (e.g., which can be determined via scanning universal product codes and/or price tags associated with the products/services that the entity 102 is trying to procure). As yet another example, the current transaction context data 502 can, in some cases, include a geo-location of the current transaction and/or of the financial instrument scanning system 106 (e.g., which can be determined via a global positioning sensor, which can be preprogrammed into the context component 208, and/or which be retrieved by the context component 208 from any suitable database and/or data structure that is accessible to the context component 208). As still another example, the current transaction context data 502 can, in some cases, include a device identifier that corresponds to the financial instrument scanning system 106 (e.g., which can be preprogrammed into the context component 208, and/or which be retrieved by the context component 208 from any suitable database and/or data structure that is accessible to the context component 208). As still another example, the current transaction context data 502 can, in some cases, include an identifier that corresponds to a merchant that facilitates the current transaction and/or that owns/operates the financial instrument scanning system 106 (e.g., which can be preprogrammed into the context component 208, and/or which be retrieved by the context component 208 from any suitable database and/or data structure that is accessible to the context component 208). In various aspects, note that some types of information that can be included in the current transaction context data 502 can be constant across transactions for the financial instrument scanning system 106 (e.g., in some cases, the geo-location of the financial instrument scanning system 106 can be constant and/or unchanging across transactions; in some cases, the device identifier of the financial instrument scanning system 106 can be constant and/or unchanging across transaction; in some cases, the identifier corresponding to the merchant that owns/operates the financial instrument scanning system 106 can be constant and/or unchanging across transactions), whereas other types of information that can be included in the current transaction context data 502 can vary across transactions for the financial instrument scanning system 106 (e.g., in some cases, the time and/or monetary amount to be charged can change depending upon the transaction).

Figure 6:
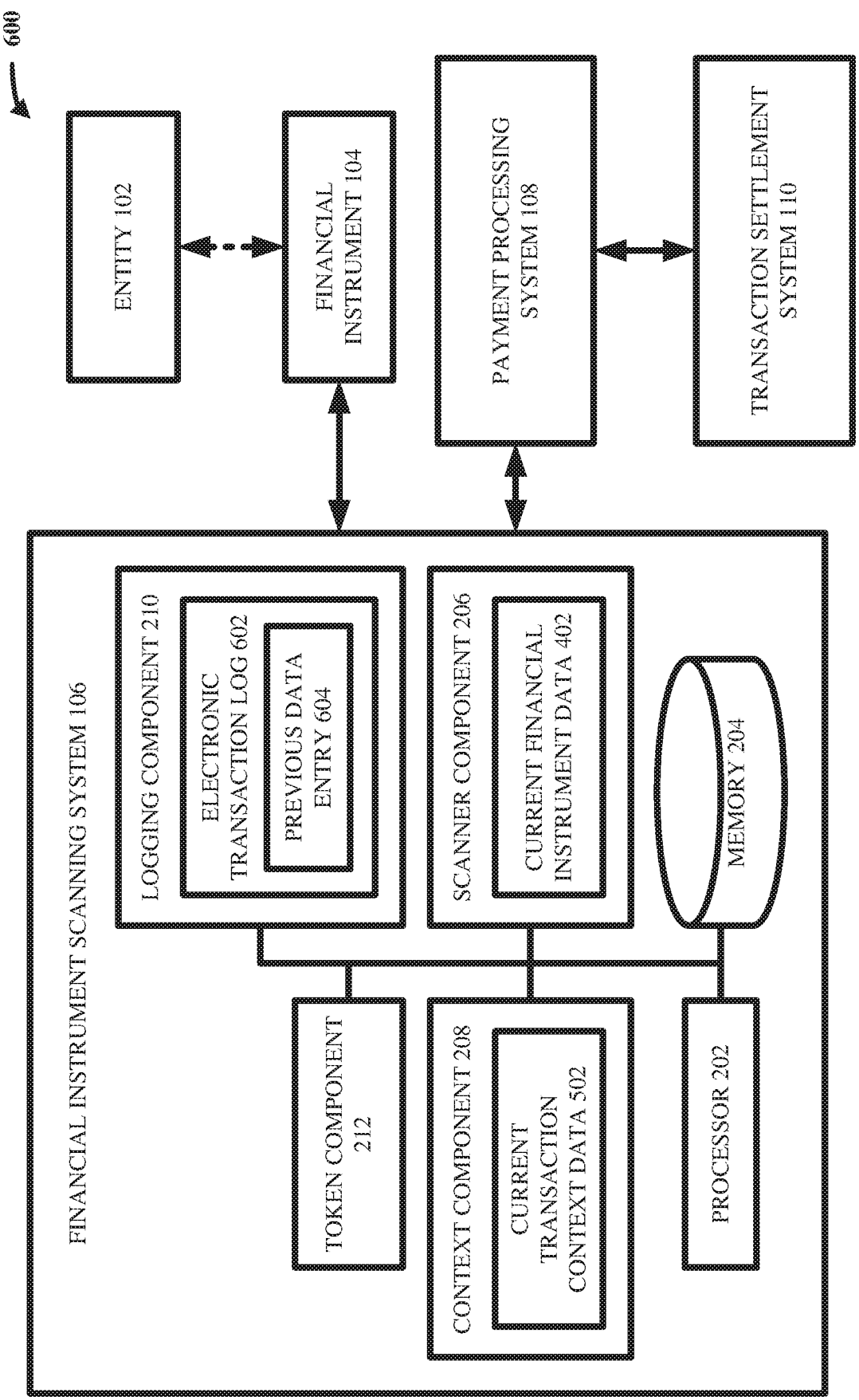
FIG. 6 illustrates a high-level block diagram of an example, non-limiting system including a previous data entry in an electronic transaction log that facilitates implementation of child tokens for improved transaction data storage in accordance with one or more embodiments described herein.

FIG. 6 illustrates a high-level block diagram of an example, non-limiting system 600 including a previous data entry in an electronic transaction log that can facilitate implementation of child tokens for improved transaction data storage in accordance with one or more embodiments described herein. As shown, the system 600 can, in various cases, comprise the same components as the system 500, and can further comprise an electronic transaction log 602 storing a previous data entry 604.

As mentioned above, the logging component 210 can in various aspect, maintain the electronic transaction log 602. In various aspects, the electronic transaction log 602 can be any suitable database and/or data structure that can store one or more data entries. In various aspects, the one or more data entries can respectively correspond to one or more transactions facilitated by the financial instrument scanning system 106 (e.g., past transactions that involved the financial instrument scanning system 106). In various instances, each data entry in the electronic transaction log 602 can store metadata (e.g., financial instrument data, transaction context data) associated with a transaction that respectively corresponds to the data entry (e.g., data entry 1 can store metadata that characterizes transaction 1, data entry 2 can store metadata that characterizes transaction 2, and so on). In various embodiments, the logging component 210 can query and/or search through the electronic transaction log 602 in order to identify a previous data entry 604. In various cases, the previous data entry 604 can list previous financial instrument data (e.g., previous payment data extracted from a previous financial instrument during a previous transaction) that matches and/or corresponds to the current financial instrument data 402.

Figure 7:
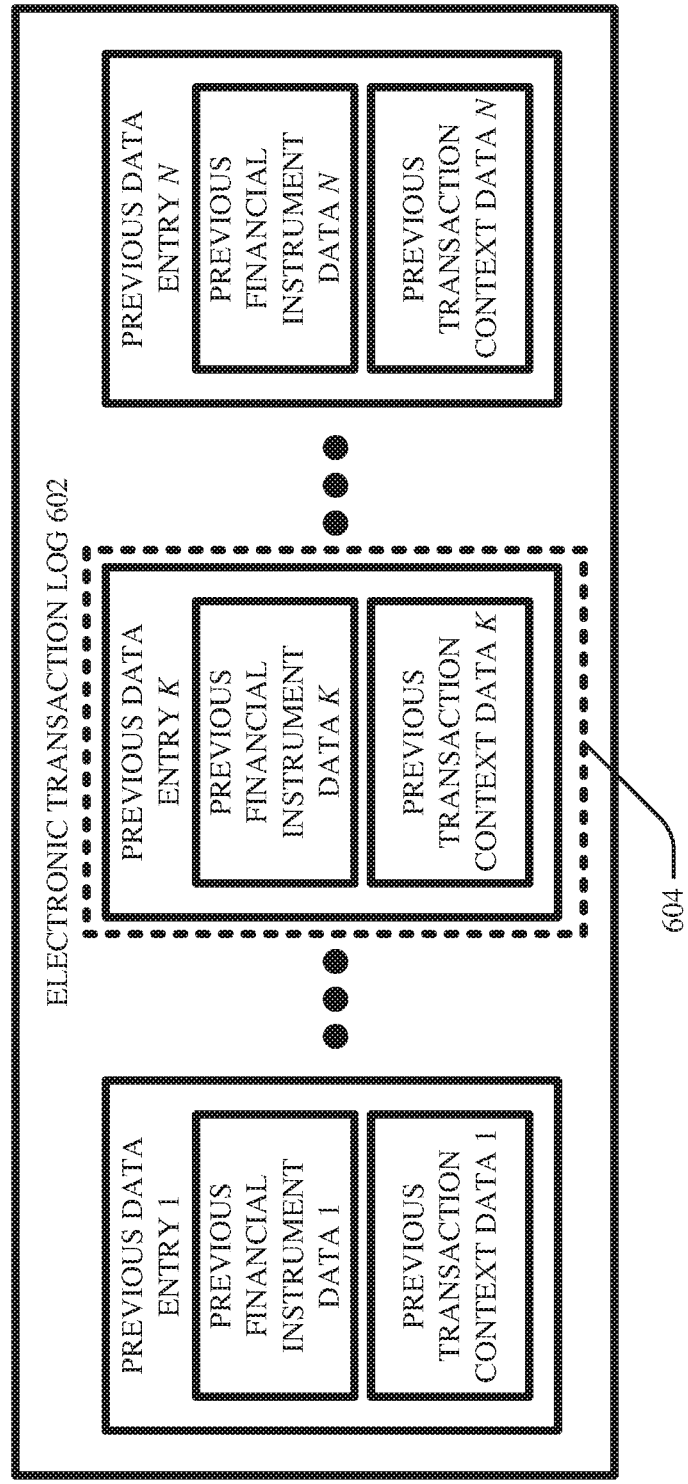
FIG. 7 illustrates a high-level block diagram of an example, non-limiting electronic transaction log that facilitates implementation of child tokens for improved transaction data storage in accordance with one or more embodiments described herein.

FIG. 7 illustrates a high-level block diagram of an example, non-limiting electronic transaction log that facilitates implementation of child tokens for improved transaction data storage in accordance with one or more embodiments described herein. In other words, FIG. 7 depicts an exemplary embodiment of the electronic transaction log 602.

As shown, the electronic transaction log 602 can, in some embodiments, comprise N previous and/or existing data entries (e.g., previous data entry 1 to previous data entry N), for any suitable integer N. In various instances, each previous data entry can correspond to a previous transaction, and each previous data entry can include, contain, and/or list previous financial instrument data and/or previous transaction context data of its corresponding previous transaction (e.g., previous data entry 1 can list the previous financial instrument data 1 of a previous transaction 1 and can list the previous transaction context data 1 of the previous transaction 1, previous data entry N can list the previous financial instrument data N of a previous transaction N and can list the previous transaction context data N of the previous transaction N, and so on). In various aspects, a K-th previous data entry, for any suitable integer K from 1 to N, can list financial instrument data that matches and/or corresponds to the current financial instrument data 402 (e.g., a previous data entry K can be the previous data entry 604). In other words, the previous data entry K can list the previous financial instrument data K of a previous transaction K and can list the previous transaction context data K of the previous transaction K. Moreover, in various aspects, the previous financial instrument data K can match, correspond to, and/or be the same as the current financial instrument data 402. In such case, it can be inferred that the financial instrument 104 that is being presented to the financial instrument scanning system 106 during the current transaction was also presented to the financial instrument scanning system 106 during the K-th previous transaction.

Figure 8:
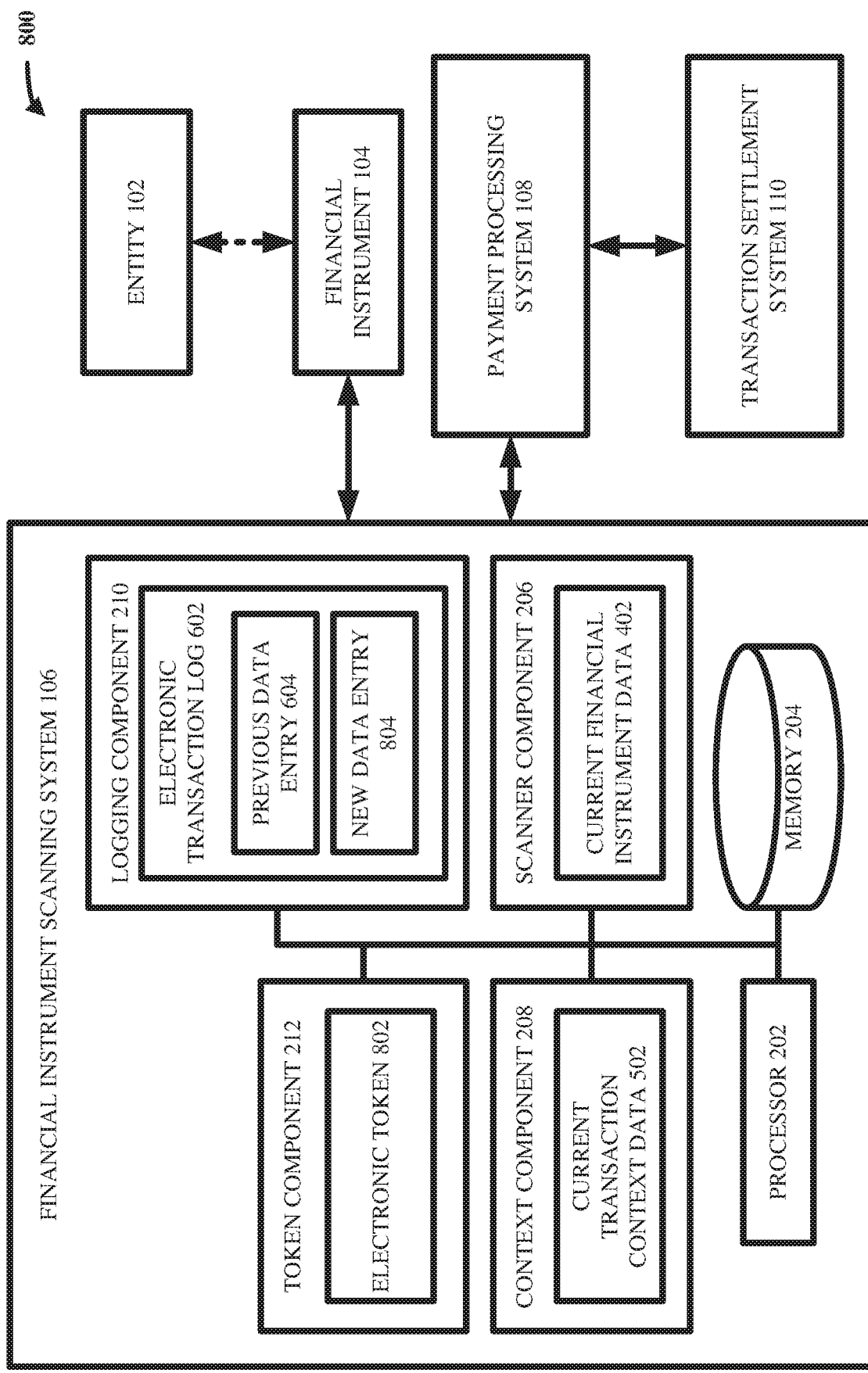
FIG. 8 illustrates a high-level block diagram of an example, non-limiting system including an electronic token and a new data entry in the electronic transaction log that facilitates implementation of child tokens for improved transaction data storage in accordance with one or more embodiments described herein.

FIG. 8 illustrates a high-level block diagram of an example, non-limiting system 800 including an electronic token and a new data entry in the electronic transaction log that can facilitate implementation of child tokens for improved transaction data storage in accordance with one or more embodiments described herein. As shown, the system 800 can, in various cases, comprise the same components as the system 600, and can further comprise an electronic token 802 and a new data entry 804.

As mentioned above, the logging component 210 can query and/or search through the electronic transaction log 602 to identify the previous data entry 604 (e.g., to determine whether a previous/existing data entry lists financial instrument data that matches and/or corresponds to the current financial instrument data 402). If the logging component 210 is unable to identify the previous data entry 604 (e.g., if the previous data entry 604 as described above does not exist in the electronic transaction log 602), the logging component 210 can determine that the current financial instrument data 402 is not already stored in the electronic transaction log 602 (e.g., there can be no existing data entry that lists financial instrument data that matches and/or corresponds to the current financial instrument data 402). Accordingly, the logging component 210 can store in a new data entry 804 in the electronic transaction log 602 both the current financial instrument data 402 and the current transaction context data 502 (e.g., such that the new data entry 804 now lists the metadata associated with the current transaction).

However, if the logging component 210 identifies the previous data entry 604, (e.g., if the previous data entry 604 as described above exists in the electronic transaction log 602), the logging component 210 can determine that the current financial instrument data 402 is already stored in the electronic transaction log 602 (e.g., there is an existing data entry that lists financial instrument data that matches and/or corresponds to the current financial instrument data 402). In such case, the logging component 210 can store in the new data entry 804 in the electronic transaction log 602 the current transaction context data 502 but not the current financial instrument data 402. Moreover, the logging component 210 can invoke the token component 212.

In various aspects, the token component 212 can, upon invocation by the logging component 210, store an electronic token 802 in the new data entry 804. In various aspects, the electronic token 802 can be stored in the new data entry 804 instead of the current financial instrument data 402. Moreover, in various aspects, the electronic token 802 can be any suitable electronic identifier (e.g., character string, numeric identifier, alphanumeric identifier) that references, refers to, and/or otherwise points to the previous data entry 604. In other words, the electronic token 802 can indicate in any suitable way that the financial instrument data that should be listed in the new data entry 804 is the same as the financial instrument data that is already listed in the previous data entry 604. Since the current financial instrument data 402 is already stored in the previous data entry 604, there can be no need to redundantly store the current financial instrument data 402 in the new data entry

804. Accordingly, the electronic token can be store instead. In various aspects, the electronic token 802 can take up less memory/storage space than the current financial instrument data 402. In this way, an amount of wasted memory/storage space in the electronic transaction log 602 can be reduced, which is a concrete and tangible technical improvement.

In various aspects, the token component 212 can include any suitable computational logic that allows the token component 212 to determine what portion of the metadata of the current transaction is already stored in the previous data entry 604. Accordingly, the electronic token 802 can be configured to indicate that such portion of the metadata of the current transaction is already stored in the previous data entry 604 (e.g., the electronic token 802 can indicate that the financial instrument data is the same between the previous data entry 604 and the new data entry 804, can indicate that a merchant identifier/address is the same between the previous data entry 604 and the new data entry 804, can indicate that a device identifier is the same between the previous data entry 604 and the new data entry 804, and/or so on). This can help to further optimize memory/storage space.

Figure 9:
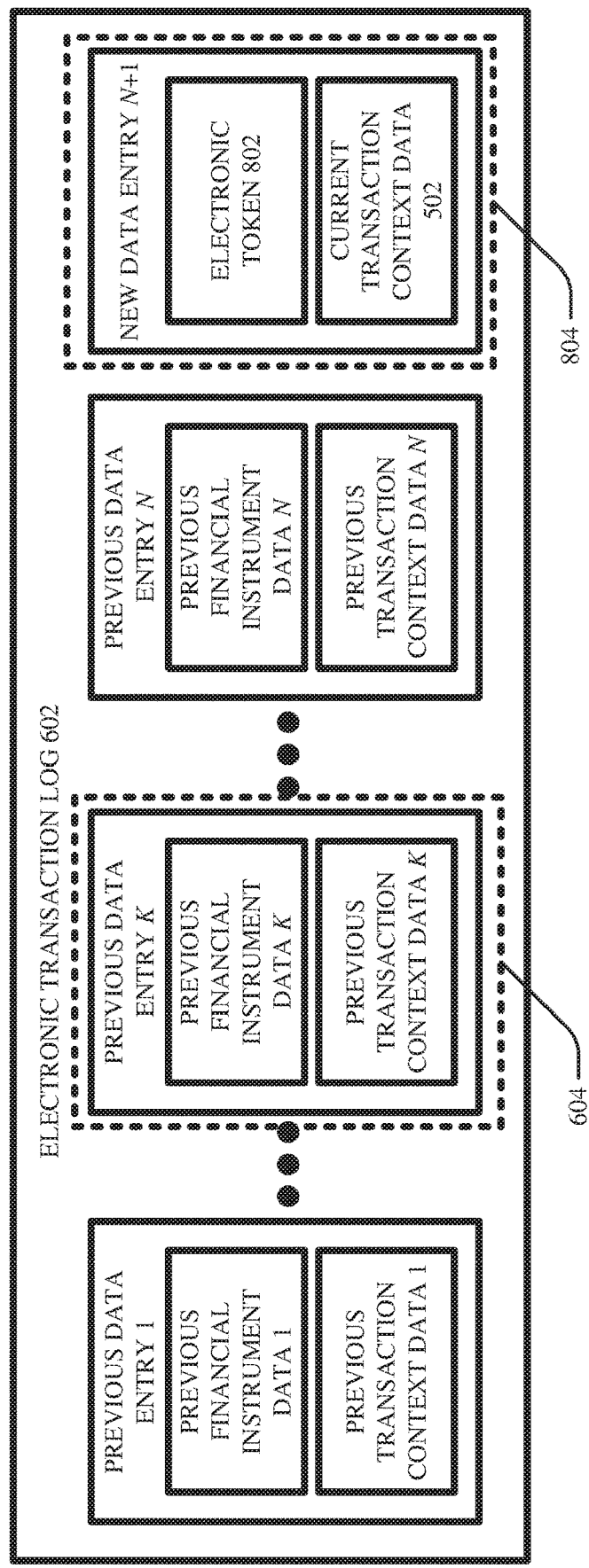
FIG. 9 illustrates a high-level block diagram of an example, non-limiting electronic transaction log that facilitates implementation of child tokens for improved transaction data storage in accordance with one or more embodiments described herein.

FIG. 9 illustrates a high-level block diagram of an example, non-limiting electronic transaction log that can facilitate implementation of child tokens for improved transaction data storage in accordance with one or more embodiments described herein. In other words, FIG. 9 depicts an exemplary embodiment of the electronic transaction log 602.

As shown, the electronic transaction log 602 can, in various instances, comprise an (N+1)-th data entry (e.g., a new data entry N+1) that corresponds to the current transaction (e.g., that stores metadata associated with the current transaction). In various aspects, the new data entry N+1 can be considered as the new data entry 804. As shown, the new data entry N+1 can list the current transaction context data 502 (e.g., because the current transaction context data 502 can be not already stored in the electronic transaction log 602). As also shown, the new data entry N+1 can store the electronic token 802 instead of the current financial instrument data 402. As explained above, the previous financial instrument data K can match, correspond to, and/or be the same as the current financial instrument data 402. That is, the current financial instrument data 402 can be already stored in the previous data entry K. Since the current financial instrument data 402 can be already stored in the previous data entry K, there can be no need to redundantly and/or repetitively store the current financial instrument data 402 in the new data entry N+1. Accordingly, the electronic token 802 can be stored in the new data entry N+1 instead of the current financial instrument data 402. As mentioned above, the electronic token 802 can reference, refer to, and/or otherwise point to the previous data entry K (e.g., can indicate that the previous financial instrument data K is applicable to and/or should be reused for the new data entry N+1). Since the electronic token 802 can take up less memory/storage space than can the current financial instrument data 402, the electronic token 802 enables for an amount of wasted memory/storage space to be reduced.

To help clarify some of the above discussion, consider the following non-limiting example. Suppose that a customer (e.g., the entity 102) swipes their payment card (e.g., the financial instrument 104) during a first transaction at 10:30 am at merchant ABC for a purchase of $20. Accordingly, the card reader device (e.g., the financial instrument scanning system 106) of the merchant ABC can store in a first data entry (e.g., 604) the time of the first transaction (e.g., 10:30 am), the amount of the first transaction (e.g., $20), an authorization/authentication ID corresponding to the first transaction, an identifier corresponding to the customer and/or to the customer's payment card, a loyalty/rewards identifier corresponding to the customer, an address and/or identifier corresponding to the merchant ABC, an identifier corresponding to the card reader device of the merchant ABC, and/or so on. In various aspects, storing all this information can cause the first data entry to take up 10 kilobytes of memory/storage space in the card reader device. Now, suppose that the same customer returns to the merchant ABC at 12:45 pm and uses the same payment card to conduct a second transaction of $150. In such case, the card reader device of the merchant ABC can scan the customer's payment card during the second transaction, and can determine that it matches and/or is the same payment card that was used during the first transaction. Accordingly, the card reader device of the merchant ABC can store in a second data entry (e.g., 804) the time of the second transaction (e.g., 12:45 pm), the amount of the second transaction (e.g., $150), and/or an authorization/authentication ID corresponding to the second transaction. Moreover, the card reader device of the merchant ABC can store in the second data entry an electronic token (e.g., 802) instead of redundantly storing the identifier corresponding to the customer and/or to the customer's payment card. That is, the electronic token can indicate that the identifier of the customer and/or of the customer's payment card that is listed for the first transaction can be reused for processing the second transaction. In some cases, the electronic token can further indicate, as applicable, that other metadata of the second transaction matches the stored metadata of the first transaction (e.g., can indicate that the loyalty/rewards identifier is the same between the first and second transactions, that the address and/or identifier of the merchant ABC is the same between the first and second transaction, that the identifier of the card reader device is the same between the first and second transactions, and/or so on). In various aspects, storing this reduced amount of information can cause the second data entry to take up 1 kilobyte of memory/storage space in the card reader device. In various cases, if all of the actual metadata for the second transaction were stored within the second data entry instead of the electronic token, the second data entry could take up 10 kilobytes of memory/storage space. Thus, when the electronic token is implemented, the first data entry and the second data entry can collectively take up 11 kilobytes of memory/storage space in the card reader device, as opposed to the 20 kilobytes that conventional systems/techniques would require. In this way, the card reader device can avoid redundantly storing information, which can save memory/storage space.

It should be appreciated that the details/numbers presented in the above example are exemplary and non-limiting.

Figure 10:
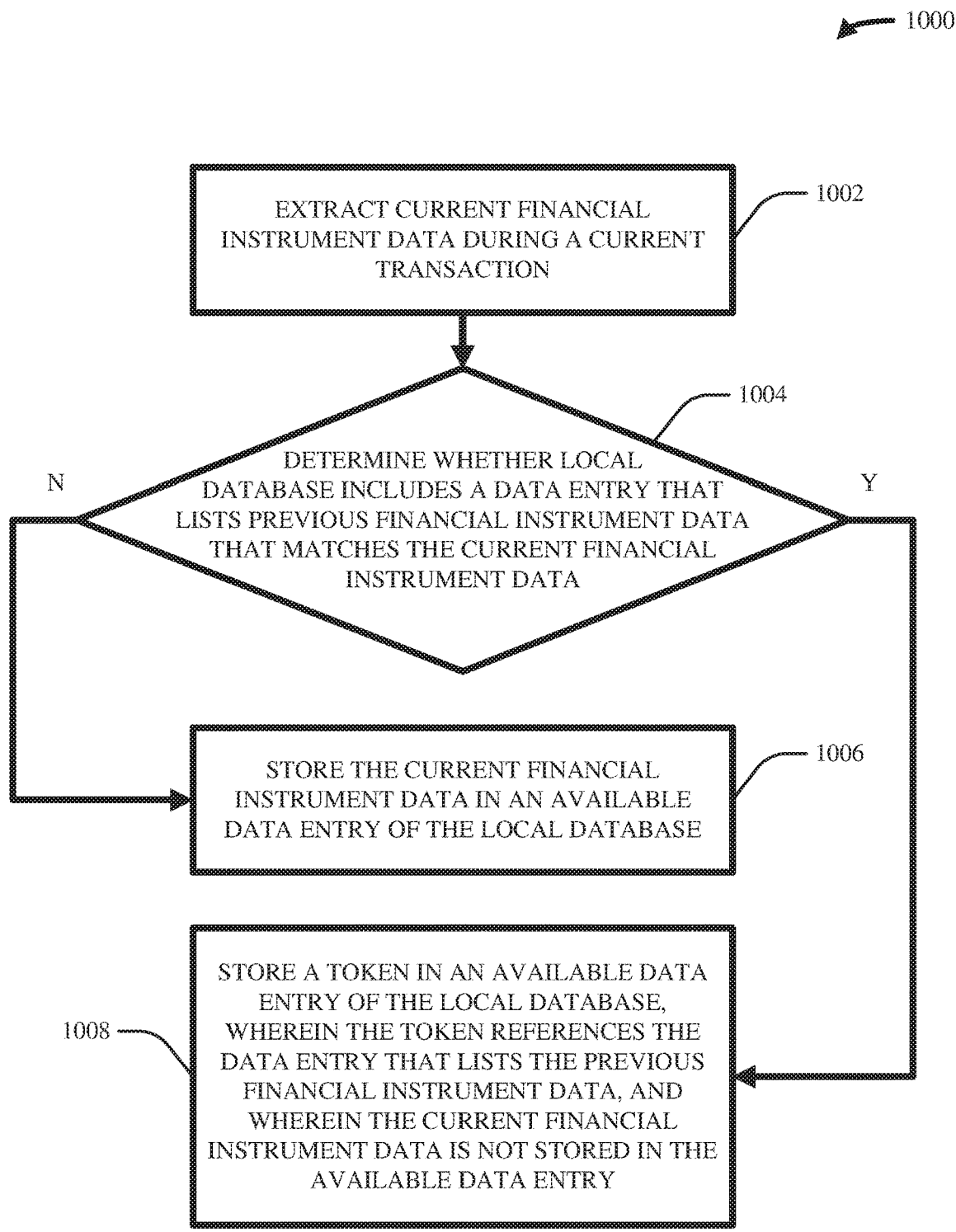
FIG. 10 illustrates a high-level flow diagram of an example, non-limiting computer implemented method that facilitates implementation of child tokens for improved transaction data storage in accordance with one or more embodiments described herein.

FIG. 10 illustrates a high-level flow diagram of an example, non-limiting computer implemented method 1000 that can facilitate implementation of child tokens for improved transaction data storage in accordance with one or more embodiments described herein.

In various embodiments, act 1002 can include extracting current financial instrument data (e.g., 402) during a current transaction.

In various instances, act 1004 can include determining whether a local database (e.g., 602) includes a data entry (e.g., 604) that lists previous financial instrument data (e.g., previous financial instrument data K) that matches and/or corresponds to the current financial instrument data. If no, the computer-implemented method 1000 can proceed to act 1006. If yes, the computer-implemented method 1000 can proceed to act 1008.

In various aspects, act 1006 can include storing the current financial instrument data in an available data entry of the local database (e.g., the current financial instrument data is not already-stored, and so storing it in the database can be necessary).

In various instances, act 1008 can include storing a token (e.g., 802) in an available data entry (e.g., 804) of the local database. In various cases, the token can reference the data entry that lists the previous financial instrument data. In various aspects, the current financial instrument data can be not stored in the available data entry. As explained above, since the current financial instrument data is already stored in the local database, redundantly storing the current financial instrument data can be unnecessary.

Figure 11:
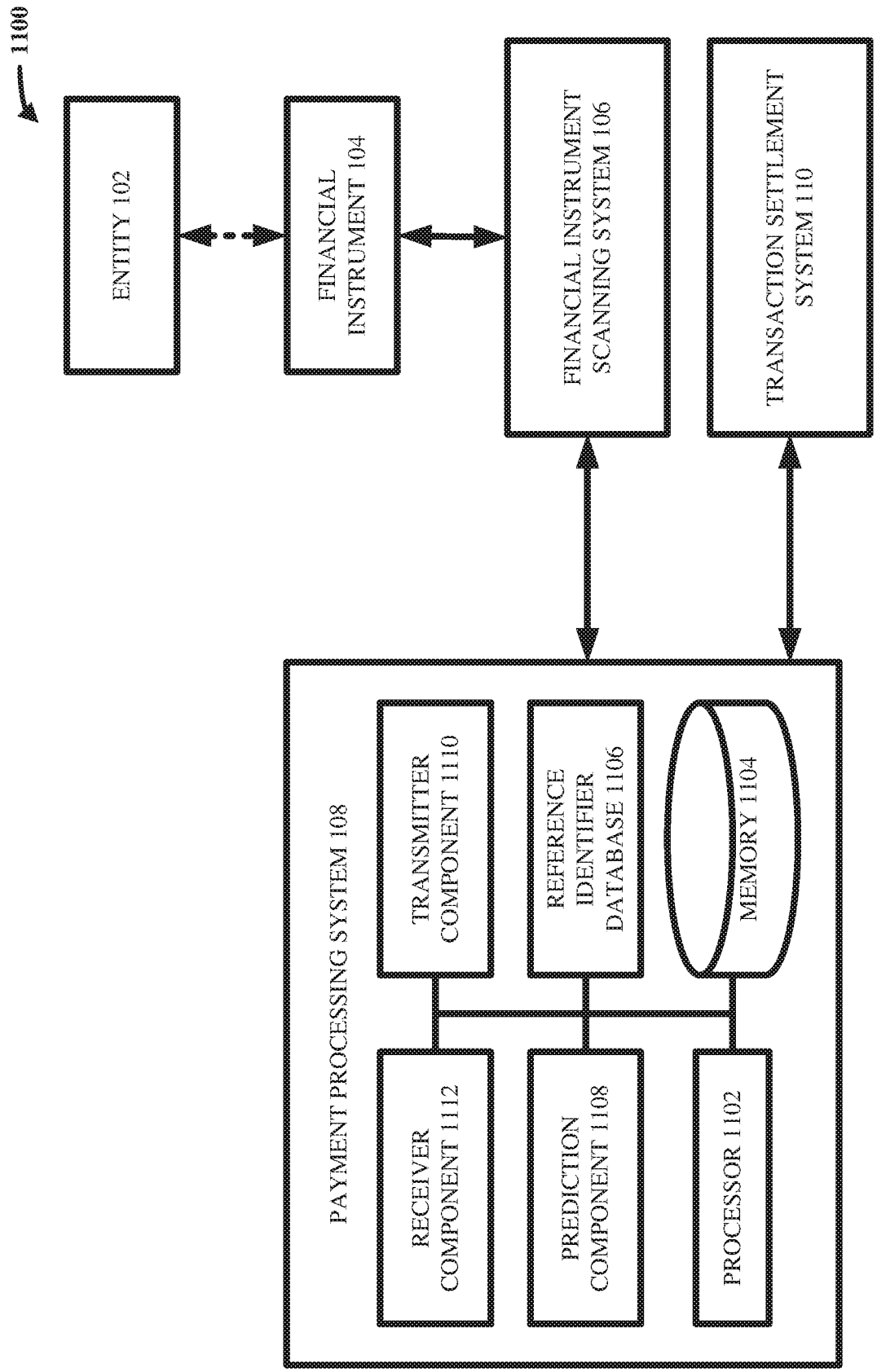
FIG. 11 illustrates a high-level block diagram of an example, non-limiting system that facilitates implementation of reduced transaction information payloads based on transaction predictions for quicker computerized payment processing in accordance with one or more embodiments described herein.

FIG. 11 illustrates a high-level block diagram of an example, non-limiting system 1100 that can facilitate implementation of reduced transaction information payloads based on transaction predictions for quicker computerized payment processing in accordance with one or more embodiments described herein. As shown, FIG. 11 can depict various components of the payment processing system 108.

In various embodiments, the payment processing system 108 can comprise a processor 1102 (e.g., computer processing unit, microprocessor) and a computer-readable memory 1104 that is operably and/or operatively and/or communicatively connected/coupled to the processor 1102. The memory 1104 can store computer-executable instructions which, upon execution by the processor 1102, can cause the processor 1102 and/or other components of the payment processing system 108 (e.g., reference identifier database 1106, prediction component 1108, transmitter component 1110, receiver component 1112) to perform one or more acts. In various embodiments, the memory 1104 can store computer-executable components (e.g., reference identifier database 1106, prediction component 1108, transmitter component 1110, receiver component 1112), and the processor 1102 can execute the computer-executable components.

In various embodiments, the payment processing system 108 can comprise a reference identifier database 1106. In various aspects, the reference identifier database 1106 can store and/or maintain a set of reference identifiers (e.g., one or more reference identifiers). Accordingly, in various aspects, the reference identifier database 1106 can comprise any suitable database and/or data structure that can store and/or maintain such reference identifiers (e.g., relational database, graph database, hybrid database) In various instances, the set of reference identifiers can respectively correspond to a set of customers and/or to a set of payment data, such that each customer in the set of customers can have a corresponding reference identifier and/or corresponding payment information (e.g., a first customer can correspond to a first reference identifier and can correspond to first payment data, in which case the first reference identifier can be considered as corresponding to the first payment data; a second customer can correspond to a second reference identifier and to second payment data, in which case the second reference identifier can correspond to the second payment data; and so on). In various aspects, the reference identifier database 1106 can be preprogrammed with the set of reference identifiers, and/or the reference identifier database 1106 can obtain the set of reference identifiers from any other suitable database and/or data structure which is accessible to the reference identifier database 1106.

In various embodiments, the payment processing system 108 can comprise a prediction component 1108. In various instances, the prediction component 1108 can predict that a customer (e.g., and/or multiple customers) from the set of customers whose information is stored in the reference identifier database 1106 is likely to engage in a future transaction within a predetermined period of time. In various instances, the prediction component 1108 can generate such a prediction by executing a trained machine learning classifier. In various instances, the trained machine learning classifier can be any suitable computational model that implements artificial intelligence to analyze input data and to correspondingly generate output data. In various aspects, the prediction generated by the prediction component 1108 can be at any suitable level of specificity, generality, and/or granularity. For instance, in various cases, the prediction component 1108 can specifically predict that a particular customer is likely to engage in a future transaction with a particular merchant and/or at a particular location within the next 48 hours. In such case, the trained machine learning classifier can be configured to receive any suitable information pertaining to the particular customer (e.g., purchasing history of the particular customer, online browsing history of the particular customer, product/service preferences of the particular customer, demographics of the particular customer, online shopping carts of the particular customers, online wish lists of the particular customer) and/or any suitable information pertaining to the particular merchant (e.g., address/location of the particular merchant, available inventory of the particular merchant, operating hours of the particular merchant, advertising material of the particular merchant, online consumption by the particular customer of the particular merchant's advertising material, online interaction by the particular customer with the website and/or application of the particular merchant, prior transactions between the particular customer and the particular merchant). In various aspects, based on such received input information, the trained machine learning classifier can be configured to generate as output a classification and/or label indicating a likelihood and/or probability that the particular customer will transact (and/or will attempt to transact) with the particular merchant within the next 48 hours (e.g., and/or within any other suitable time period). In various other cases, however, the prediction component 1108 can generally predict that a particular customer is likely to transact within the next 48 hours, without specifically predicting the particular merchant with whom and/or the particular location at which the particular customer is likely to transact. In such case, the trained machine learning classifier can be configured to receive any suitable information pertaining to the particular customer (e.g., purchasing history of the particular customer, online browsing history of the particular customer, product/service preferences of the particular customer, demographics of the particular customer, online shopping carts of the particular customers, online wish lists of the particular customer). In various aspects, based on such received input information, the trained machine learning classifier can be configured to generate as output a classification and/or label indicating a likelihood and/or probability that the particular customer will transact (and/or will attempt to transact) within the next 48 hours (e.g., and/or within any other suitable time period). In various instances, if the likelihood and/or probability generated by the trained machine learning classifier exceeds a threshold level (e.g., 50%, 60%, 75%, and/or any other suitable probability level), the prediction component 1108 can infer that the particular customer is likely to transact within a specified time frame.

In various aspects, the input information that is analyzed by the trained machine learning classifier can be obtained/retrieved by the prediction component 1108 from any suitable database and/or data structure that is accessible to the prediction component 1108.

In various embodiments, the payment processing system 108 can comprise a transmitter component 1110. In various aspects, the reference identifier database 1106 can locate within its entries payment data from the set of payment data that corresponds to the predicted customer, and the transmitter component 1110 can transmit to the transaction settlement system 110 an electronic instruction/command, which can cause the transaction settlement system 110 to queue and/or cache the payment data that corresponds to the predicted customer. In other words, the prediction component 1108 can, in various instances, predict that a particular customer is likely to attempt to transact within a specified period of time, and the transmitter component 1110 can cause the transaction settlement system 110 to preemptively queue/cache the payment data of that particular customer in preparation for processing/settling a transaction involving that particular customer. If and/or when the particular customer actually engages in a transaction, the payment data of that particular customer will already be queued and/or cached at the transaction settlement system 110, and so settlement of the transaction can be more quickly facilitated and/or performed. In various cases, the transmitter component 1110 can be any suitable device that is capable of transmitting electronic instructions/commands (e.g., transmitter, transceiver).

In various embodiments in which the prediction component 1108 predicts that the predicted customer is likely to transact with a particular merchant, the reference identifier database 1106 can locate within its entries a reference identifier from the set of reference identifiers that corresponds to the predicted customer, and the transmitter component 1110 can transmit the reference identifier corresponding to the predicted customer to the financial instrument scanning system 106 (e.g., assuming that the financial instrument scanning system 106 is owned/operated by and/or otherwise corresponds to the particular merchant). In various aspects, the financial instrument scanning system 106 can then be on the search for a financial instrument having payment data that corresponds to the reference identifier of the predicted customer (e.g., as explained above with respect to the reference identifier database 1106, a reference identifier can correspond to both a customer and/or to payment data).

In various embodiments, the payment processing system 108 can comprise a receiver component 1112. In various aspects, the receiver component 1112 can receive from the financial instrument scanning system 106 a reduced transaction information payload that is associated with the reference identifier that corresponds to the predicted customer. In various instances, the reduced transaction information payload can be any suitable data packet that indicates and/or includes metadata of a transaction that is completed using a financial instrument that corresponds to the reference identifier of the predicted customer. In other words, the reduced transaction information payload can include and/or indicate metadata that corresponds to a transaction engaged in by the predicted customer. In various instances, the reduced transaction information payload can include and/or indicate context data of the transaction engaged in by the predicted customer. In various instances, however, the reduced transaction information payload can exclude and/or not indicate the payment data of the predicted customer. That is, the financial instrument scanning system 106 can, in some cases, facilitate a transaction with the predicted customer by scanning a financial instrument of the predicted customer, and the financial instrument scanning system 106 can return to the receiver component 1112 the time/amount of the transaction and can refrain from returning to the receiver component 1112 the payment data of the predicted customer. In various aspects, it can be unnecessary for the financial instrument scanning system 106 to collect and/or transmit the payment data of the predicted customer since the payment data of the predicted customer can be already queued/cached at the transaction settlement system 110. In various cases, the receiver component 1112 can be any suitable device that is capable of receiving electronic instructions/commands (e.g., receiver, transceiver).

In various instances, the transmitter component 1110 can transmit and/or forward the reduced transaction information payload to the transaction settlement system 110 for settlement. In various instances, the financial instrument scanning system 106 can directly transmit the reduced transaction information payload to the transaction settlement system 110 for settlement.

In various aspects, such a system can provide computational performance benefits in two ways. First, a digital size of the reduced transaction information payload can be smaller than a digital size of a full and/or un-reduced transaction information payload (e.g., it can require fewer computing resources and/or less computing time to collect and/or transmit a reduced transaction information payload as compared to a full-size transaction information payload). Thus, by implementing a reduced transaction information payload, a transmission/communication time between the financial instrument scanning system 106 and the payment processing system 108 (and/or between the financial instrument scanning system 106 and the transaction settlement system 110) can be reduced, which is a concrete and tangible technical improvement. Second, because the transaction settlement system 110 can have already queued and/or cached the payment data of the predicted customer, settlement of the transaction can be more quickly performed (e.g., since the payment data can be queued/cached in advance, the transaction settlement system can settle the transaction by applying and/or processing the context data included in the reduced transaction information payload; if the payment data were instead not queued/cached in advance, the transaction settlement system would have to apply and/or process both the payment data and the context data in order to settle the transaction, which would require a greater computation/processing/settlement time). Thus, various embodiments of the subject innovation can quicken computerized transaction settlement times, which constitutes a concrete and tangible technical improvement.

In various embodiments in which the prediction component 1108 predicts that the predicted customer is likely to transact in general (e.g., without predicting a particular merchant and/or location), the reference identifier database 1106 can locate within its entries a reference identifier from the set of reference identifiers that corresponds to the predicted customer, but the transmitter component 1110 can refrain from transmitting the reference identifier corresponding to the predicted customer to the financial instrument scanning system 106 and/or to any other financial instrument scanning system (e.g., since the merchant/location of the predicted transaction is not known/predicted, the transmitter component 1110 can fail to know which financial instrument scanning system of which merchant to transmit the reference identifier of the predicted customer to). Instead, the receiver component 1112 can wait to receive a reduced transaction information payload from a financial instrument scanning system.

In various embodiments, the receiver component 1112 can receive from the financial instrument scanning system 106 a reduced transaction information payload that includes and/or indicates a reference identifier. In various instances, the reference identifier database 1106 can compare the reference identifier included in the reduced transaction information payload to the reference identifier that corresponds to the predicted customer. If the reference identifier database 1106 determines that the reference identifier included in the reduced transaction information payload matches, corresponds to, and/or is the same as the reference identifier that corresponds to the predicted customer, the transmitter component 1110 can forward and/or transmit the reduced transaction information payload to the transaction settlement system 110 for settlement. In other words, the payment data of the predicted customer can be queued/cached at the transaction settlement system 110, the reduced transaction information payload can be determined to correspond to the predicted customer since it includes and/or indicates a reference identifier that matches, corresponds to, and/or is the same as the reference identifier of the predicted customer, and the transaction can be settled by simply forwarding the reduced transaction information payload (e.g., containing context data but not payment data) to the transaction settlement system 110. On the other hand, if the reference identifier database 1106 determines that the reference identifier included in the reduced transaction information payload does not match and/or correspond to the reference identifier of the predicted customer, the reference identifier database 1106 can search through its entries to identify payment information that corresponds to the reference identifier included in the reduced transaction information payload (e.g., the reference identifier included in the reduced transaction information payload can be identified in the set of reference identifiers within the reference identifier database 1106, and thus payment data in the set of payment data within the reference identifier database 1106 that corresponds to such reference identifier can be likewise identified). The transmitter component 1110 can then transmit the reduced transaction information payload and the payment data corresponding to the reference identifier included in the reduced transaction information payload to the transaction settlement system 110 for settlement. In other words, the payment data of the predicted customer can be queued/cached at the transaction settlement system 110, but the reduced transaction information payload can be determined to correspond to a customer other than the predicted customer since it includes and/or indicates a reference identifier that does not match and/or correspond to the reference identifier of the predicted customer. Accordingly, the payment information of this different, non-predicted customer can be identified via the reference identifier database 1106, and the transaction can be settled by forwarding both the reduced transaction information payload (e.g., containing context data but not payment data) and the payment data of the different, non-predicted customer to the transaction settlement system 110.

Since such embodiments can still involve reduced transaction information payloads and preemptive queuing/caching of payment data of predicted customers, such embodiments can experience reduced transmission and/or settlement times as compared to conventional systems/techniques, which thus constitutes a concrete and tangible technical improvement.

In various embodiments, the transmitter component 1110 can transmit dequeuing and/or un-caching instructions to the transaction settlement system 110, based on any suitable triggering criteria. For example, in some cases, the transmitter component 1110 can instruct the transaction settlement system 110 to dequeue/un-cache payment data if the predetermined and/or threshold period of time expires (e.g., if the prediction component 1108 predicts that a customer is likely to transact within the next 24 hours, the transmitter component 1110 can transmit a dequeuing/un-caching instruction to the transaction settlement system 110 after the expiration of that 24 hour period). As another example, in some cases, the transmitter component 1110 can instruct the transaction settlement system 110 to dequeue/un-cache payment data if the prediction component 1108 determines that the predicted transaction is likely to fail and/or default. For instance, in some cases, the prediction component 1108 can comprise a second trained machine learning classifier that determines whether predicted transactions are likely to be successful/unsuccessful. In such case, the first machine learning classifier discussed above can be considered as predicting future transactions that are likely to be attempted by particular customers, and the second trained machine learning classifier can be considered as predicting whether such predicted future transactions are likely to default and/or be risky. Any suitable input information can be fed into such a second trained machine learning classifier (e.g., credit history of the predicted customer, credit limit of the predicted customer, available funds of the predicted customer, prior defaults of the predicted customer, criminal history of the predicted customer).

Figure 12:
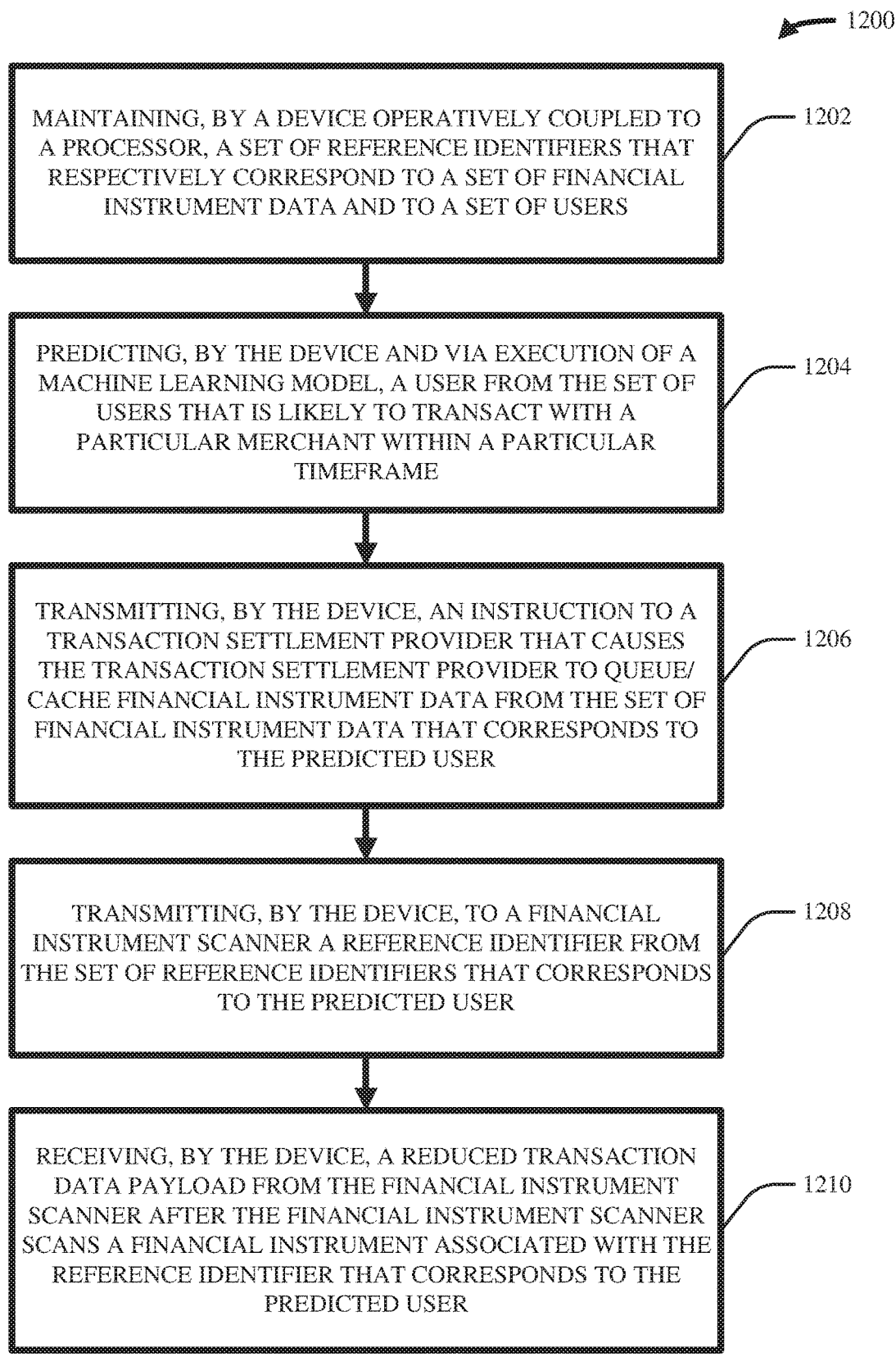
FIGS. 12-13 illustrate high-level flow diagrams of example, non-limiting computer-implemented methods that facilitate implementation of reduced transaction information payloads based on transaction predictions for quicker computerized payment processing in accordance with one or more embodiments described herein.
Figure 13:
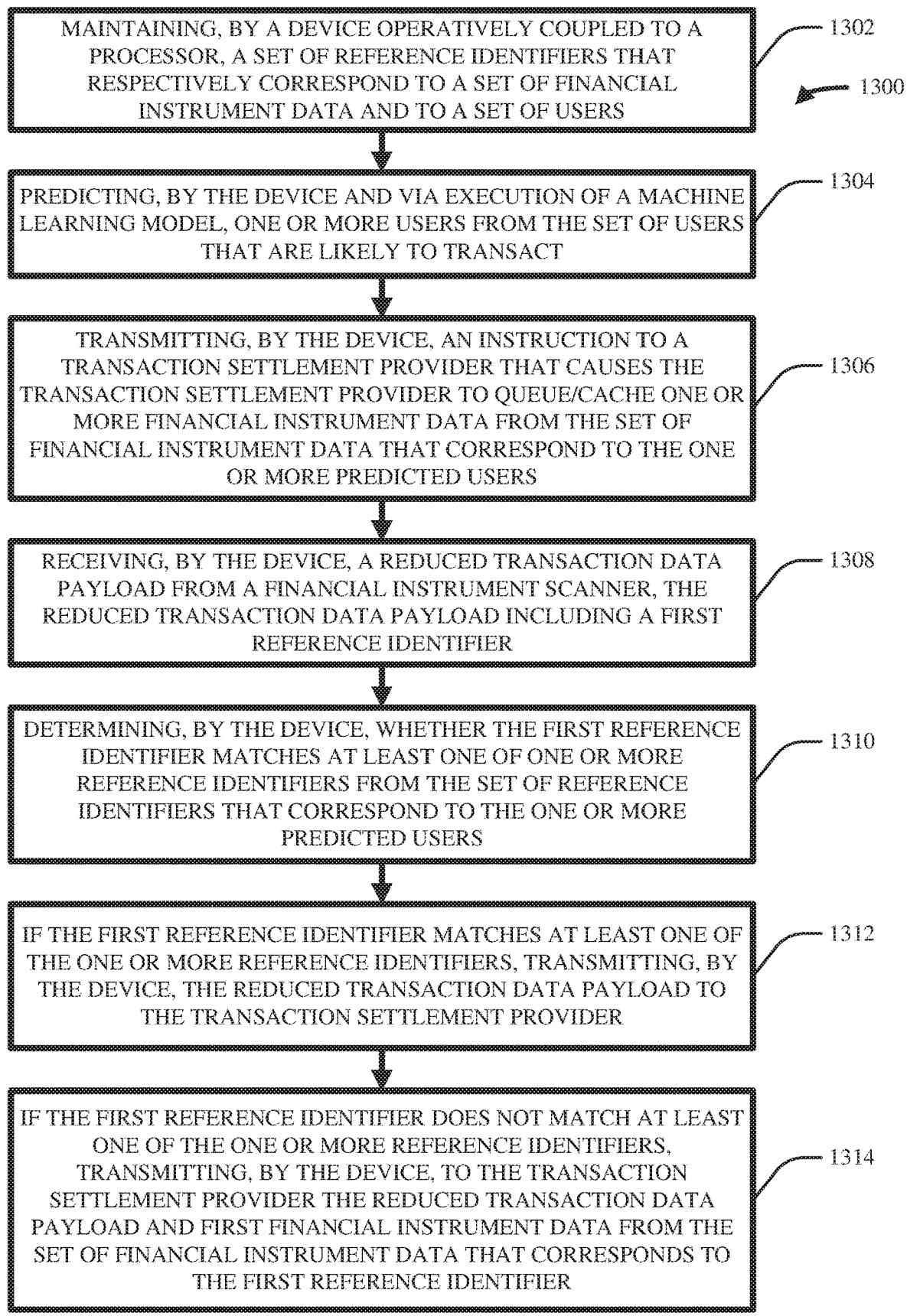

FIGS. 12-13 illustrate high-level flow diagrams of example, non-limiting computer-implemented methods 1200 and 1300 that can facilitate implementation of reduced transaction information payloads based on transaction predictions for quicker computerized payment processing in accordance with one or more embodiments described herein. In various aspects, the computer-implemented methods 1200 and 1300 can be facilitated by the system 1100.

Consider the computer-implemented method 1200. In various embodiments, act 1202 can include maintaining, by a device operatively coupled to a processor (e.g., 1106), a set of reference identifiers that respectively correspond to a set of financial instrument data and to a set of users.

In various aspects, act 1204 can include predicting, by the device and via execution of a machine learning model (e.g., 1108), a user from the set of users that is likely to transact with a particular merchant within a particular timeframe (e.g., this can be a specific and/or granular prediction as discussed above).

In various instances, act 1206 can include transmitting, by the device (e.g., 1110), an instruction to a transaction settlement provider (e.g., 110) that causes the transactions settlement provider to queue/cache financial instrument data from the set of financial instrument data that corresponds to the predicted user.

In various aspects, act 1208 can include transmitting, by the device (e.g., 1110), to a financial instrument scanner (e.g., 106) a reference identifier from the set of reference identifiers that corresponds to the predicted user.

In various cases, act 1210 can include receiving, by the device (e.g., 1112), a reduced transaction data payload from the financial instrument scanner after the financial instrument scanner scans a financial instrument associated with the reference identifier that corresponds to the predicted user. In various instances, the device can then forward and/or transmit the reduced transaction data payload to the transaction settlement provider for settlement.

Consider the computer-implemented method 1300. In various embodiments, act 1302 can include maintaining, by a device operatively coupled to a processor (e.g., 1106), a set of reference identifiers that respectively correspond to a set of financial instrument data and to a set of users.

In various aspects, act 1304 can include predicting, by the device and via execution of a machine learning model (e.g., 1108), one or more users from the set of users that are likely to transact (e.g., this can be a general prediction as described above).

In various instances, act 1306 can include transmitting, by the device (e.g., 1110), an instruction to a transaction settlement provider (e.g., 110) that causes the transaction settlement provider to queue/cache one or more financial instrument data from the set of financial instrument data that correspond to the one or more predicted users.

In various cases, act 1308 can include receiving, by the device (e.g., 1112), a reduced transaction data payload from a financial instrument scanner (e.g., 106), wherein the reduced transaction data payload includes a first reference identifier.

In various aspects, act 1310 can include determining, by the device (e.g., 1106), whether the first reference identifier matches and/or corresponds to at least one of one or more reference identifiers from the set of reference identifiers that correspond to the one or more predicted users.

In various instances, act 1312 can include, if the first reference identifier matches and/or corresponds to at least one of the one or more reference identifiers, transmitting, by the device (e.g., 1110), the reduced transaction data payload to the transaction settlement provider.

In various cases, act 1314 can include, if the first reference identifier does not match and/or correspond to at least one of the one or more reference identifiers, transmitting, by the device (e.g., 1110), to the transaction settlement provider the reduced transaction data payload and first financial instrument data from the set of financial instrument data that corresponds to the first reference identifier.

Figure 14:
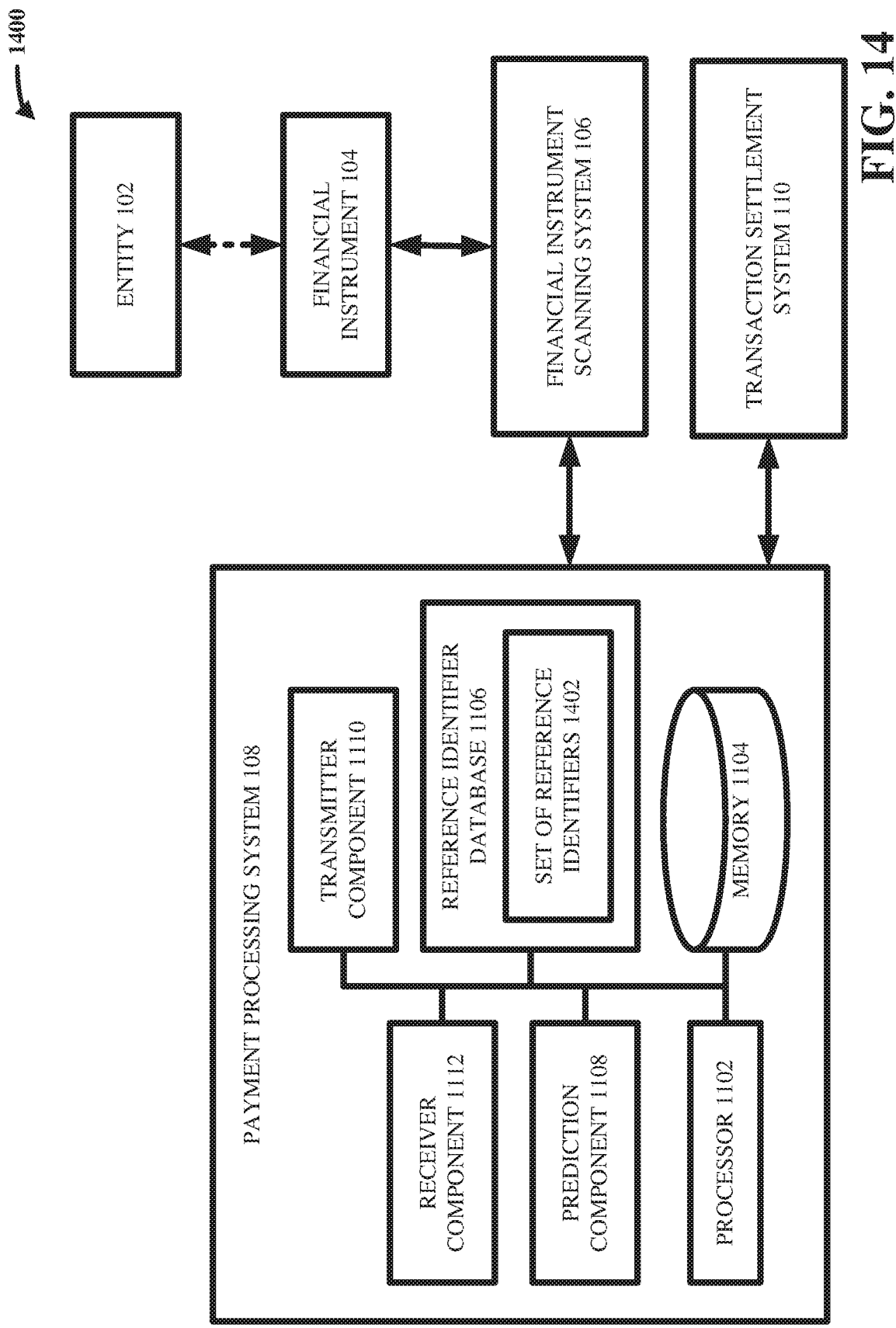
FIG. 14 illustrates a high-level block diagram of an example, non-limiting system including a set of reference identifiers that facilitates implementation of reduced transaction information payloads based on transaction predictions for quicker computerized payment processing in accordance with one or more embodiments described herein.

FIG. 14 illustrates a high-level block diagram of an example, non-limiting system 1400 including a set of reference identifiers that can facilitate implementation of reduced transaction information payloads based on transaction predictions for quicker computerized payment processing in accordance with one or more embodiments described herein. As shown, the system 1400 can, in various cases, comprise the same components as the system 1100, and can further comprise a set of reference identifiers 1402.

As mentioned above, the reference identifier database 1106 can electronically store and/or maintain the set of reference identifiers 1402. In various aspects, each reference identifier in the set of reference identifiers 1402 can be any suitable numeric identifier, alphanumeric identifier, and/or character string. In various aspects, the set of reference identifiers 1402 can respectively correspond to a set of users and/or to a set of financial instrument data. That is, in various aspects, a first reference identifier in the set of reference identifiers 1402 can correspond to a first user and to first financial instrument data (e.g., such that the first user can be said to correspond to the first financial instrument data), a second reference identifier in the set of reference identifiers 1402 can correspond to a second user and to second financial instrument data (e.g., such that the second user can be said to correspond to the second financial instrument data), and so on. In various aspects, the reference identifier database 1106 can obtain and/or retrieve the set of reference identifiers 1402 and/or the set of financial instrument data corresponding to the set of users from any suitable database and/or data structure which is accessible to the reference identifier database 1106. In some cases, the set of reference identifiers 1402 and/or the set of financial instrument data corresponding to the set of users can be inputted into the reference identifier database 1106 via any suitable technique.

Figure 15:
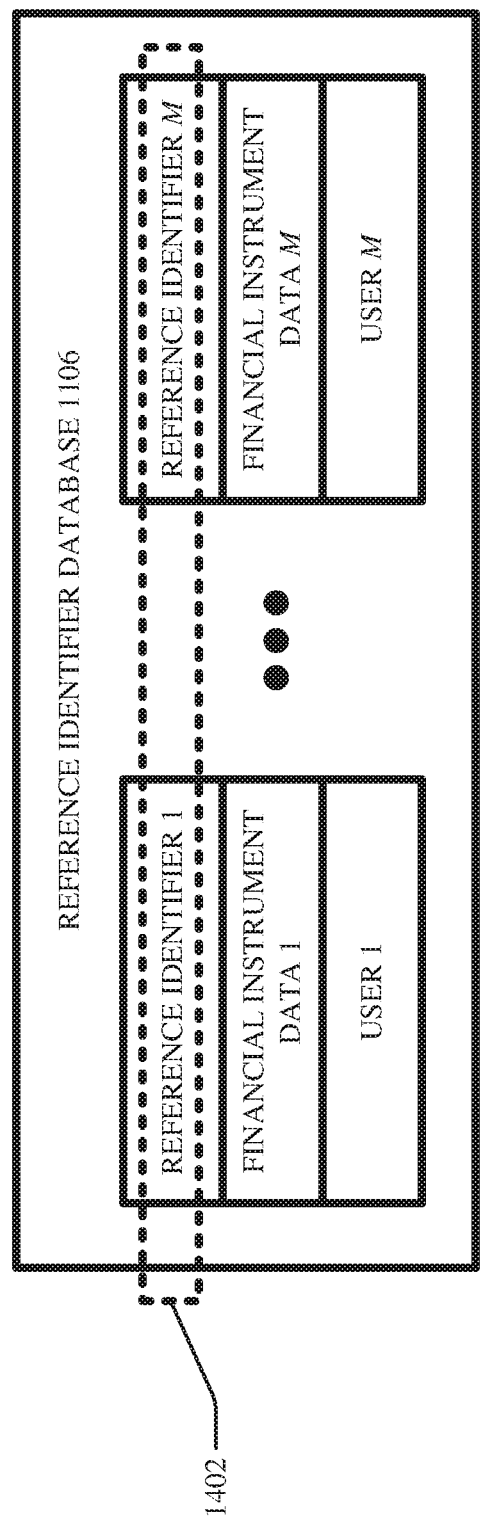
FIG. 15 illustrates a high-level block diagram of an example, non-limiting reference identifier database that that facilitates implementation of reduced transaction information payloads based on transaction predictions for quicker computerized payment processing in accordance with one or more embodiments described herein

FIG. 15 illustrates a high-level block diagram of an example, non-limiting reference identifier database that that can facilitate implementation of reduced transaction information payloads based on transaction predictions for quicker computerized payment processing in accordance with one or more embodiments described herein. That is, FIG. 15 depicts an exemplary embodiment of the reference identifier database 1106.

As shown, the reference identifier database 1106 can include, store, and/or maintain tuples of information, where each tuple can include a particular reference identifier and particular financial instrument data corresponding to a particular user. For example, the first tuple in FIG. 15 can include the reference identifier 1 and the financial instrument data 1 which can both correspond to the user 1; the M-th tuple (for any suitable integer M) can include the reference identifier M and the financial instrument data M which can both correspond to the user M; and so on. In various instances, all of the reference identifiers in the reference identifier database 1106 can collectively make up the set of reference identifiers 1402 (e.g., the set of reference identifiers 1402 can include the reference identifier 1 to the reference identifier M). Similarly, all of the financial instrument data in the reference identifier database 1106 can collectively make up the set of financial instrument data (e.g., the set of financial instrument data can include the financial instrument data 1 to the financial instrument data M). In various aspects, although not explicitly shown, the reference identifier database 1106 can store and/or maintain any other suitable information corresponding to the users 1 to M (e.g., purchasing histories, browsing histories, product/service preferences, and/or so on).

Figure 16:
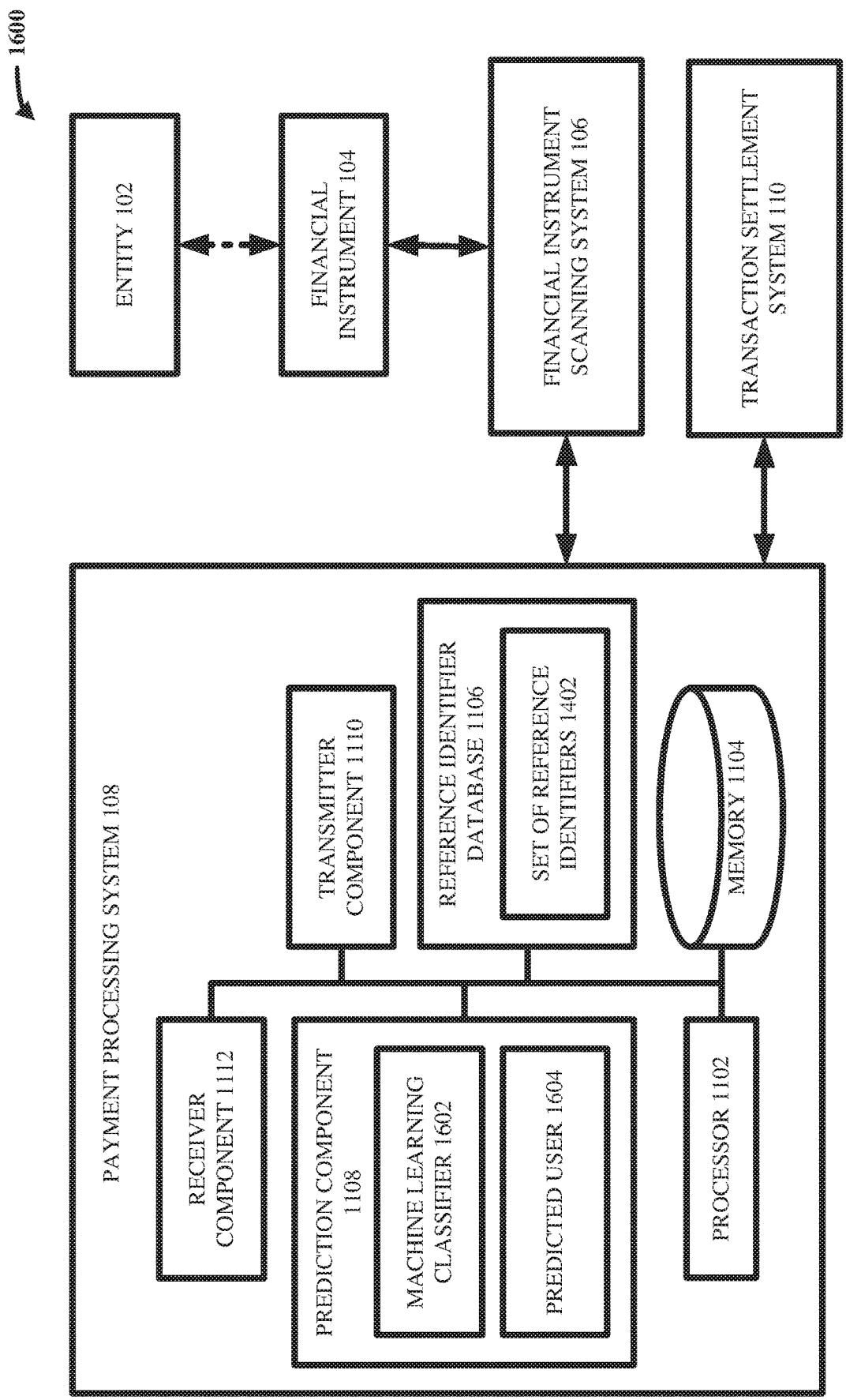
FIG. 16 illustrates a high-level block diagram of an example, non-limiting system including a machine learning classifier that facilitates implementation of reduced transaction information payloads based on transaction predictions for quicker computerized payment processing in accordance with one or more embodiments described herein.

FIG. 16 illustrates a high-level block diagram of an example, non-limiting system 1600 including a machine learning classifier that can facilitate implementation of reduced transaction information payloads based on transaction predictions for quicker computerized payment processing in accordance with one or more embodiments described herein. As shown, the system 1600 can, in some cases, comprise the same components as the system 1400, and can further comprise a machine learning classifier 1602 and a predicted user 1604.

In various embodiments, as shown, the prediction component 1108 can comprise the machine learning classifier 1602. In various instances, the machine learning classifier 1602 can be any suitable computationally-implemented model and/or algorithm that utilizes artificial intelligence to generate specified output data based on specified input data. As explained above, the machine learning classifier 1602 can predict that a particular customer (herein referred to as the predicted user 1604) is likely to engage in a future transaction within a predetermined period of time. In various aspects, the predicted user 1604 can be one of the users from the set of users whose information is stored in the reference identifier database 1106. In various instances, the prediction can be general (e.g., the machine learning classifier 1602 can be trained to infer/forecast that the predicted user 1604 is likely to transact within the predetermined period of time, without predicting where the predicted user 1604 is likely to transact and/or with whom the predicted user 1604 is likely to transact). In various other instances, the prediction can be specific/granular (e.g., the machine learning classifier 1602 can be trained to infer/forecast that the predicted user 1604 is likely to transact with a specific merchant at a specific location within the predetermined period of time). In the former case, the machine learning classifier 1602 can receive as input any suitable information pertaining to the predicted user 1604 (e.g., the machine learning classifier 1602 can receive the transaction history of the predicted user 1604, the online browsing history of the predicted user 1604, the product/service preferences of the predicted user 1604, the demographics of the predicted user 1604, online shopping cart contents of the predicted user 1604, and/or any other suitable information and can determine based on such information that the predicted user 1604 is likely to engage in a future transaction). In the latter case, the machine learning classifier 1602 can receive as input any suitable information pertaining to the predicted user 1604 and/or any suitable information pertaining to the specific merchant (e.g., transaction history between the specific merchant and the predicted user 1604, operating hours of the specific merchant, available inventor of the specific merchant, marketing material of the specific merchant, online consumption levels of the marketing material of the specific merchant by the predicted user 1604, online interaction of the predicted user 1604 with a website and/or application of the specific merchant, and/or so on). In various instances, such input information can be retrieved by the prediction component 1108 from any suitable database and/or data structure that is accessible to the prediction component 1108.

In various aspects, the machine learning classifier 1602 can be considered as a blackbox function that is defined in terms of inputs and outputs. In various aspects, the machine learning classifier 1602 can receive as input any of the above-mentioned information pertaining to the predicted user 1604 (e.g., which can be in any suitable form such as scalars, vectors, matrices, tensors, and/or character strings) and can produce as output a probability score indicating how likely the predicted user 1604 is to engage in and/or attempted a future transaction (and/or to engage in and/or attempt a future transaction with a specific merchant). In various aspects, the probability score can be in any suitable form (e.g., scalar, vector, matrix, tensor). In various cases, if the probability score is above a predetermined threshold probability (e.g., 50%, 65%, 80%, and/or other suitable probability level), the machine learning classifier 1602 can determine that the predicted user 1604 is likely to engage in and/or attempt a future transaction (e.g., and/or is likely to engage in and/or attempt a future transaction with a specific merchant) within a predetermined and/or threshold time frame (e.g., within the next 12 hours, 24 hours, 36 hours, and/or any other suitable amount of time).

To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 17:
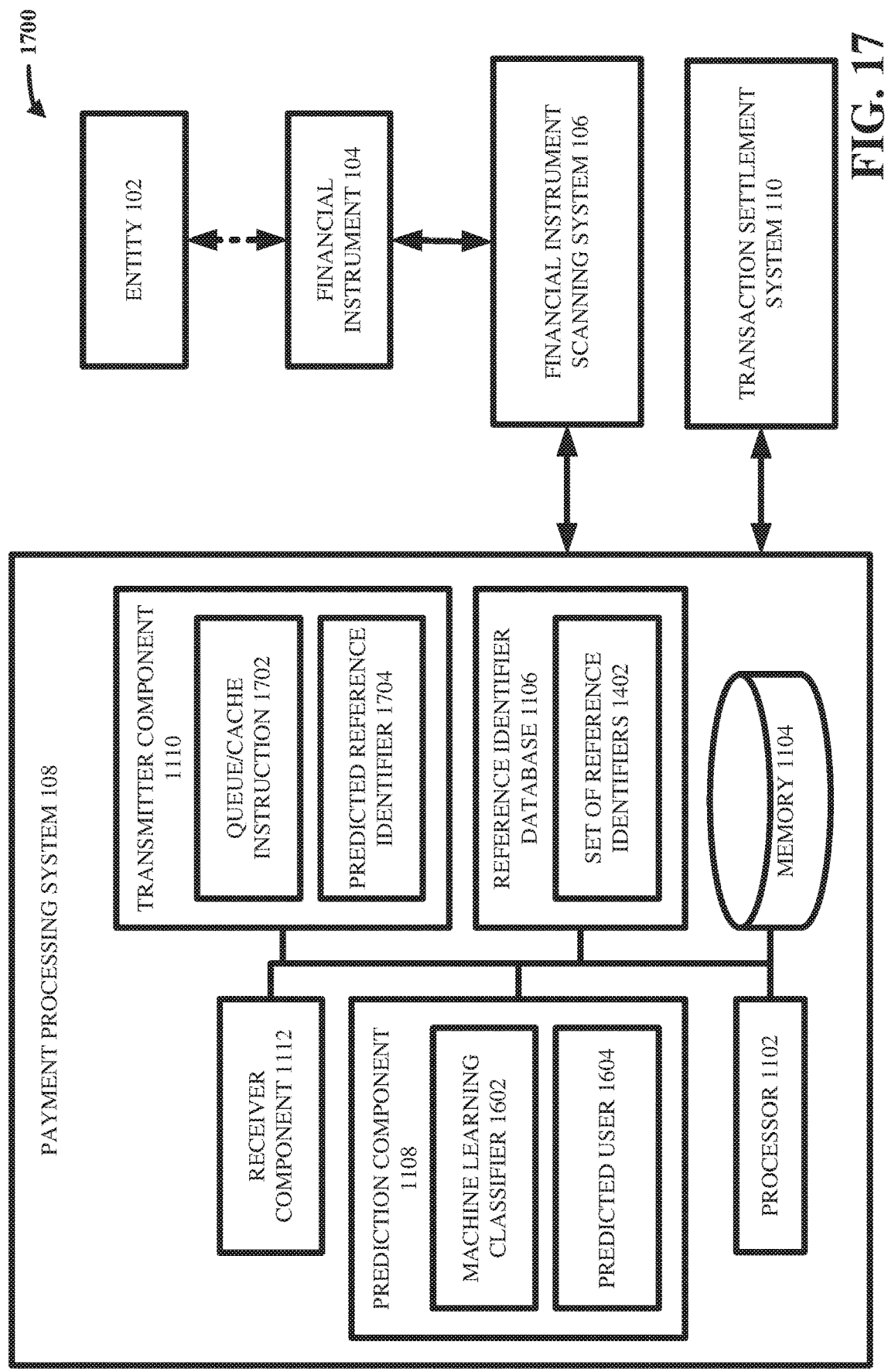
FIG. 17 illustrates a high-level block diagram of an example, non-limiting system including a queue/cache instruction that facilitates implementation of reduced transaction information payloads based on transaction predictions for quicker computerized payment processing in accordance with one or more embodiments described herein.

FIG. 17 illustrates a high-level block diagram of an example, non-limiting system 1700 including a queue/cache instruction that can facilitate implementation of reduced transaction information payloads based on transaction predictions for quicker computerized payment processing in accordance with one or more embodiments described herein. As shown, the system 1700 can, in some cases, comprise the same components as the system 1600, and can further comprise a queue/cache instruction 1702 and predicted reference identifier 1704.

In various embodiments, in response to the prediction component 1108 inferring that the predicted user 1604 is likely to engage in a future transaction, the transmitter component 1110 can transmit to the transaction settlement system 110 a queue/cache instruction 1702. In various aspects, the queue/cache instruction 1702 can cause the transaction settlement system 110 to queue and/or cache financial instrument data from the set of financial instrument data that corresponds to the predicted user 1604. In some instances, the queue/cache instruction 1702 can be accompanied by the financial instrument data that corresponds to the predicted user 1604. For instance, the reference identifier database 1106 can identify such financial instrument data within its entries based on the identity of the predicted user 1604, and the transmitter component 1110 can append such financial instrument data to the queue/cache instruction 1702. In various aspects, any other suitable technique can be implemented to cause the transaction settlement system 110 to queue and/or cache the financial instrument data corresponding to the predicted user 1604.

In various embodiments, in response to the prediction component 1108 inferring that the predicted user 1604 is likely to engage in a future transaction, the reference identifier database 1106 can identify within its entries a reference identifier from the set reference identifiers that corresponds to the predicted user 1604 (herein referred to as the predicted reference identifier 1704). In various aspects, when the prediction component 1108 determines that the predicted user 1604 is likely to transact with a specific merchant and/or at a specific location, the transmitter component 1110 can transmit the predicted reference identifier 1704 to a financial instrument scanning system (e.g., 106) that is owned/operated by the specific merchant at the specific location. In such case, the financial instrument scanning system 106 can be notified of the identity of the predicted user 1604 and/or of the financial instrument data of the predicted user 1604 (e.g., since the set of reference identifiers 1402 can respectively correspond to the set of users and to the set of financial instrument data). Thus, the financial instrument scanning system 106 can be on the lookout for a financial instrument corresponding to the predicted user 1604.

Figure 18:
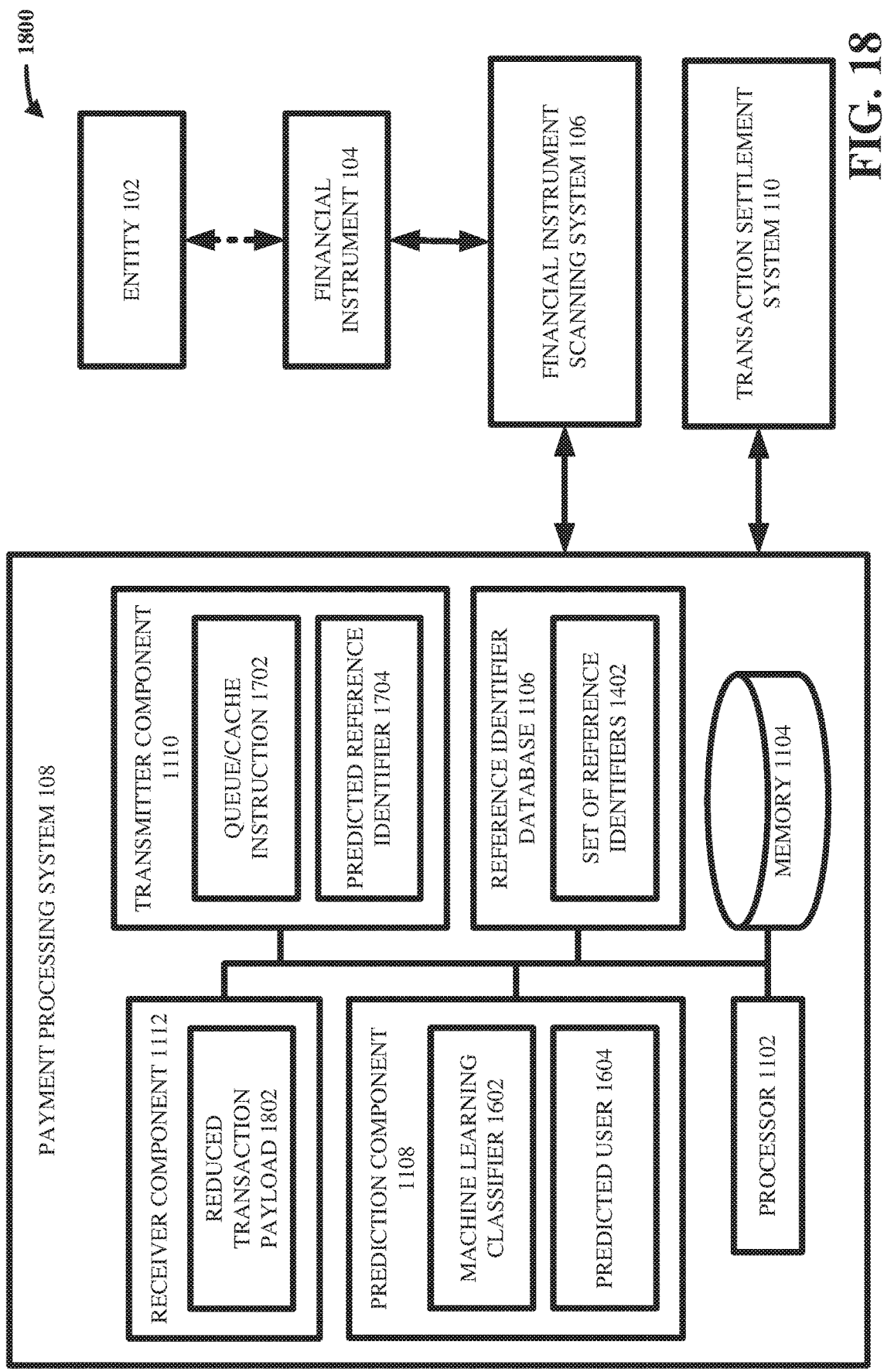
FIG. 18 illustrates a high-level block diagram of an example, non-limiting system including a reduced transaction information payload that facilitates implementation of reduced transaction information payloads based on transaction predictions for quicker computerized payment processing in accordance with one or more embodiments described herein.

FIG. 18 illustrates a high-level block diagram of an example, non-limiting system 1800 including a reduced transaction information payload that can facilitate implementation of reduced transaction information payloads based on transaction predictions for quicker computerized payment processing in accordance with one or more embodiments described herein. As shown, the system 1800 can, in some cases, comprise the same components as the system 1700, and can further comprise a reduced transaction payload 1802.

In various embodiments, the financial instrument scanning system 106 can scan a financial instrument that corresponds to the predicted reference identifier 1704 (e.g., that corresponds to the predicted user 1604). Such scanning can occur during a transaction with the predicted user 1604. In various aspects, after such scanning, the financial instrument scanning system 106 can transmit to the receiver component 1112 the reduced transaction payload 1802. As explained above, the reduced transaction payload 1802 can include and/or indicate context data associated with the transaction involving the predicted user 1604 (e.g., time/date of the transaction, monetary amount charged in the transaction). As also explained above, the reduced transaction payload 1802 can exclude and/or not indicate financial instrument data of the predicted user 1604. In various aspects, the financial instrument data corresponding to the predicted user 1604 can be already queued and/or cached at the transaction settlement system 110. Thus, in various aspects, there can be no need for the financial instrument scanning system 106 to collect and/or transmit the financial instrument data of the predicted user 1604. In some cases, the financial instrument scanning system 106 can interpret the predicted reference identifier 1704 as a notification that the financial instrument data corresponding to the predicted reference identifier 1704 (e.g., corresponding to the predicted user 1604) is already queued/cached and thus need not be collected and/or transmitted by the financial instrument scanning system 106.

In various embodiments, after the receiver component 1112 receives the reduced transaction payload 1802, the transmitter component 1110 can forward and/or transmit the reduced transaction payload 1802 to the transaction settlement system 110 so that settlement of the transaction can be completed. As explained above, settlement of the transaction can be sped up and/or quickened since transmission of the reduced transaction payload 1802 can require fewer computing resources and since the financial instrument data of the predicted user 1604 can be already queued/cached. Thus, various embodiments of the subject innovation constitute a concrete and tangible technical improvement in the field of computerized payment processing.

To help clarify some of the above discussion, consider the following non-limiting example. Suppose that the prediction component 1108 predicts that a customer L (e.g., 1604) is likely to transact with a merchant DEF within the next 24 hours. In various aspects, the reference identifier database 1106 can identify within its entries financial instrument data corresponding to the customer L, and the transmitter component 1110 can instruct the transaction settlement system 110 to queue and/or cache the financial instrument data corresponding to the customer L. Moreover, the reference identifier database 1106 can identify within its entries a reference identifier that corresponds to the customer L (e.g., 1704), and the transmitter component 1110 can transmit to a card reader device of the merchant DEF (e.g., 106) the reference identifier of the customer L. In various instances, the card reader device of the merchant DEF can scan a payment card (e.g., 104) corresponding to the reference identifier of the customer L, and the card reader device can subsequently transmit a reduced transaction payload (e.g., 1802) to the receiver component 1112, which can include context data but not payment data of the customer L (e.g., since the payment data of the customer L is already queued/cached at the transaction settlement provider, the payment data of the customer L can be left out of the reduced transaction payload). The transmitter component 1110 can then forward the reduced transaction payload to the transaction settlement system 110 for settlement.

Figure 19:
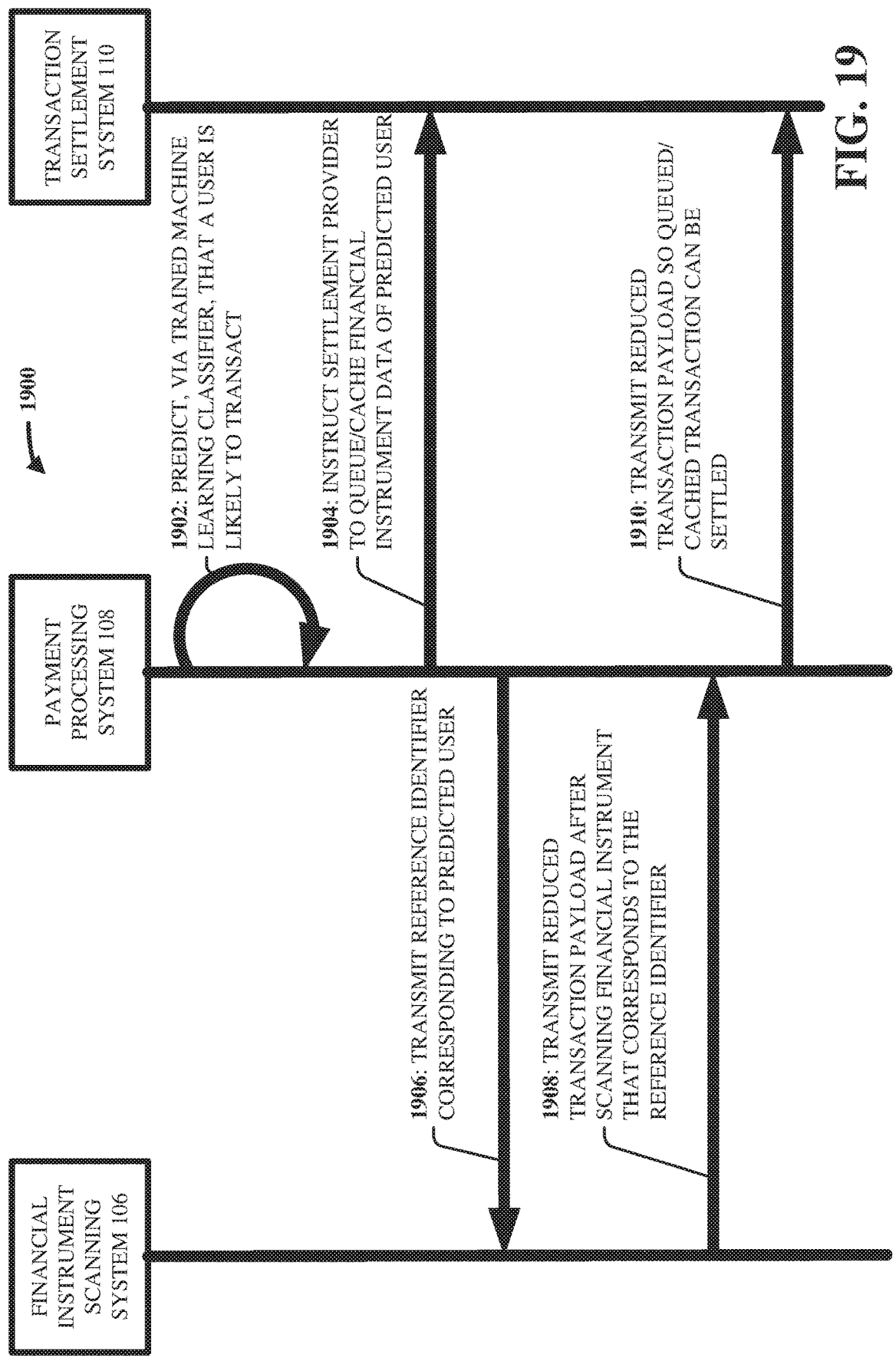
FIG. 19 illustrates a high-level block diagram of an example, non-limiting communication workflow that facilitates implementation of reduced transaction information payloads based on transaction predictions for quicker computerized payment processing in accordance with one or more embodiments described herein.

FIG. 19 illustrates a high-level block diagram of an example, non-limiting communication workflow 1900 that can facilitate implementation of reduced transaction information payloads based on transaction predictions for quicker computerized payment processing in accordance with one or more embodiments described herein.

As shown, in various embodiments, the payment processing system 108 can predict, via a trained machine learning classifier (e.g., 1602), that a user (e.g., 1604) is likely to transact (e.g., this can be a specific and/or granular prediction that identifies a specific merchant and/or location at which the user is likely to transact), at act 1902.

In various instances, the payment processing system 108 can instruct the transaction settlement system 110 to queue/cache financial instrument data of the predicted user, at act 1904.

In various aspects, the payment processing system 108 can transmit to the financial instrument scanning system 106 (e.g., which can be owned/operated by a specific merchant with whom the predicted user is likely to transact) a reference identifier (e.g., 1704) that corresponds to the predicted user, at act 1906.

In various cases, the financial instrument scanning system 106 can transmit to the payment processing system 108 a reduced transaction payload (e.g., 1802) after scanning a financial instrument (e.g., 104) that corresponds to the reference identifier (e.g., that corresponds to the predicted user).

In various instances, the payment processing system 108 can transmit to the transaction settlement system 110 the reduced transaction payload so that the queued/cached transaction can be settled.

Figure 20:
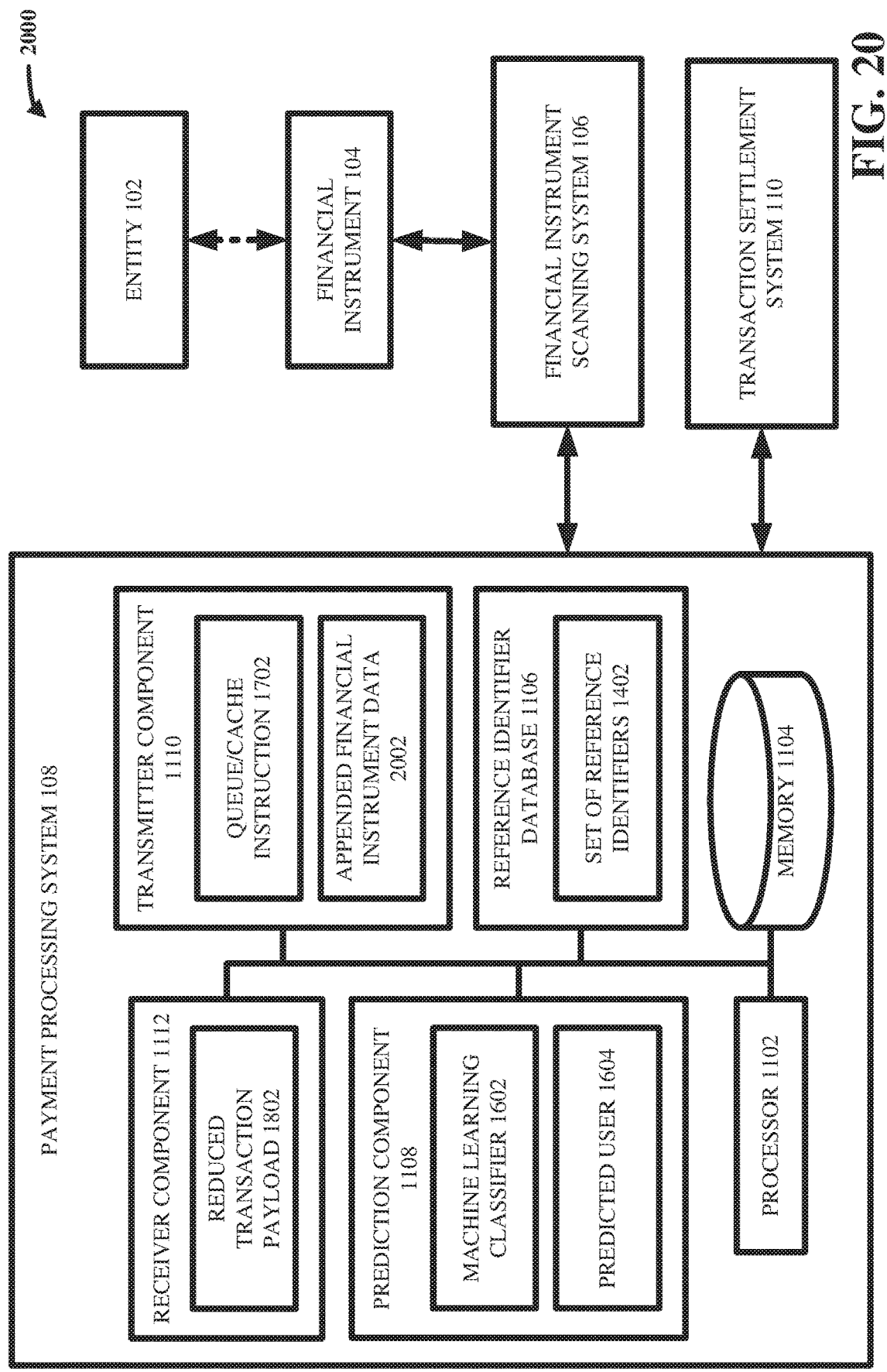
FIG. 20 illustrates a high-level block diagram of an example, non-limiting system including appended financial instrument data that facilitates implementation of reduced transaction information payloads based on transaction predictions for quicker computerized payment processing in accordance with one or more embodiments described herein.

FIG. 20 illustrates a high-level block diagram of an example, non-limiting system including appended financial instrument data that facilitates implementation of reduced transaction information payloads based on transaction predictions for quicker computerized payment processing in accordance with one or more embodiments described herein. In various instances, FIG. 20 depicts exemplary embodiments of the subject innovation when a more generic and/or less specific prediction is generated by the prediction component 1108 (e.g., when the predicted user 1604 is predicted to be likely to transact generally, without predicting a specific merchant and/or location).

As described above, the transmitter component 1110 can transmit the queue/cache instruction 1702 to the transaction settlement system 110. In various aspects, however, the transmitter component 1110 can refrain from transmitting the predicted reference identifier 1704 to the financial instrument scanning system 106. This is because the transmitter component 1110 can, in some cases, not know which of potentially many financial instrument scanning systems to send the predicted reference identifier 1704 to. In other words, when the predicted user 1604 is predicted to transact with a specific merchant, the transmitter component 1110 can transmit the predicted reference identifier 1704 to the card reader device (e.g., 106) of the predicted merchant. However, when the predicted user 1604 is simply predicted to transact generally with any number of potential merchants, the transmitter component 1110 can fail to know which of those many potential merchants (and thus which of many potential card reader devices) the predicted reference identifier 1704 should be sent to. Instead, the receiver component 1112 can simply wait to receive a reduced transaction payload from a suitable card reader device.

In various embodiments, the receiver component 1112 can receive the reduced transaction payload 1802 from the financial instrument scanning system 106. In various instances, the reduced transaction payload 1802 can include a reference identifier. In various cases, the reference identifier database 1106 can compare the reference identifier that is included in the reduced transaction payload 1802 to the predicted reference identifier 1704 (e.g., which is known to correspond to the predicted user 1604). If the reference identifier database 1106 determines that the reference identifier included in the reduced transaction payload 1802 matches, corresponds to, and/or is the same as the predicted reference identifier 1704, the transmitter component 1110 can simply forward and/or transmit the reduced transaction payload 1802 to the transaction settlement system 110 (e.g., the financial instrument data of the predicted user 1604 is already queued/cached, and the reduced transaction payload 1802 can correspond to the predicted user 1604 since included reference identifier matches and/or corresponds to the predicted reference identifier 1704). However, if the reference identifier database 1106 determines that the reference identifier included in the reduced transaction payload 1802 does not match and/or correspond to the predicted reference identifier 1704, the reference identifier database 1106 can identify within its entries financial instrument data corresponding to the reference identifier included in the reduced transaction payload 1802 (herein referred to as appended financial instrument data 2002), and the transmitter component 1110 can forward and/or transmit both the reduced transaction payload 1802 and the appended financial instrument data 2002 to the transaction settlement system 110. In other words, the financial instrument data of the predicted user 1604 can be already queued/cached, but the reduced transaction payload 1802 can correspond to user that is not the predicted user 1604 (e.g., since the included reference identifier does not match and/or correspond to the predicted reference identifier 1704). Accordingly, the financial instrument data (e.g., 2002) of the non-predicted user can be identified via the reference identifier database 1106, can be appended to the queue/cache instruction 1702, and can be transmitted to the transaction settlement system 110 so that settlement can be performed.

That is, various aspects of the subject innovation can receive reduced transaction information payloads from any suitable financial instrument scanning system, and can determine whether the reduced transaction information payloads correspond to predicted customers whose financial instrument data are already queued/cached. If a reduced transaction information payload does correspond to a predicted customer whose financial instrument data is already queued/cached, the reduced transaction information payload can be forwarded for settlement. On the other hand, if a reduced transaction information payload does not correspond to a predicted customer whose financial instrument data is already queued/cached, the reduced transaction information payload can be supplemented with the appropriate financial instrument data and then can be forwarded for settlement.

To help clarify some of the above discussion, consider the following non-limiting example. Suppose that the prediction component 1108 predicts that a customer Q (e.g., 1604) is likely to transact within the next 24 hours. In various aspects, the reference identifier database 1106 can identify within its entries financial instrument data corresponding to the customer Q, and the transmitter component 1110 can instruct the transaction settlement system 110 to queue and/or cache the financial instrument data corresponding to the customer Q. In various instances, the receiver component 1112 can receive from a card reader device a reduced transaction payload (e.g., 1802), which can include context data but not payment data. Moreover, the reduced transaction payload can include and/or indicate a reference identifier (e.g., which can indicate the customer to whom the reduced transaction payload corresponds). In various cases, the reference identifier database 1106 can determine whether the reference identifier included in the reduced transaction payload matches and/or corresponds to the reference identifier of the customer Q. If they match/correspond, it can be determined that the reduced transaction payload pertains to a transaction involving the customer Q, and so the transmitter component 1110 can forward the reduced transaction payload to the transaction settlement system 110 for settlement. However, if they do not match/correspond, it can be determined that the reduced transaction payload pertains to a transaction involving a customer that is not the customer Q. In such case, suppose that the reduced transaction payload corresponds to a customer R. Since the financial instrument data of the customer R can be not queued/cached (e.g., since the customer R was not predicted to transact), the reference identifier database 1106 can identify financial instrument data corresponding to the customer R, and the transmitter component 1110 can transmit such financial instrument data along with the reduced transaction payload to the transaction settlement system 110 for settlement.

Figure 21:
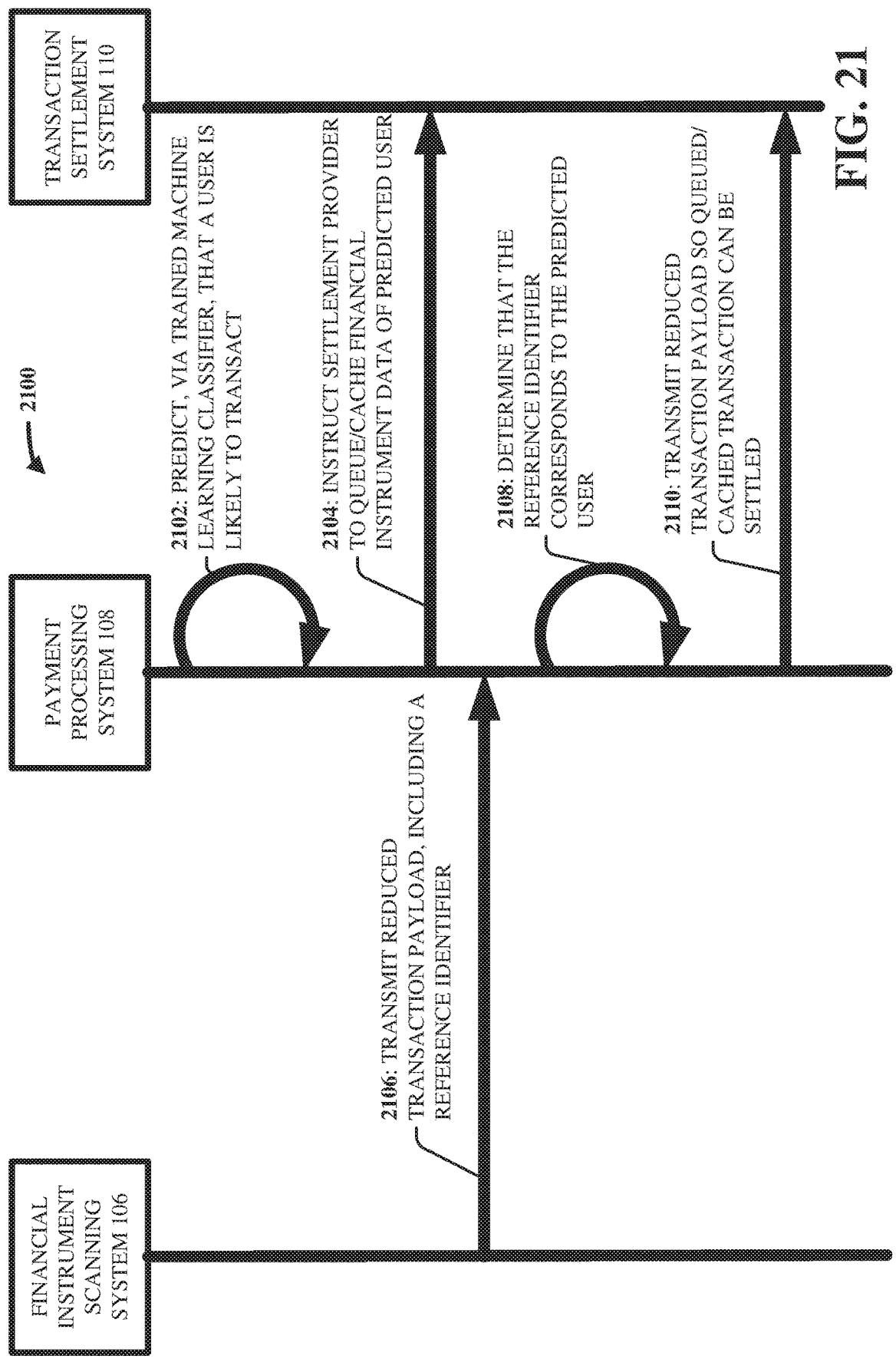
FIGS. 21-22 illustrate high-level block diagrams of an example, non-limiting communication workflows that facilitate implementation of reduced transaction information payloads based on transaction predictions for quicker computerized payment processing in accordance with one or more embodiments described herein.
Figure 22:
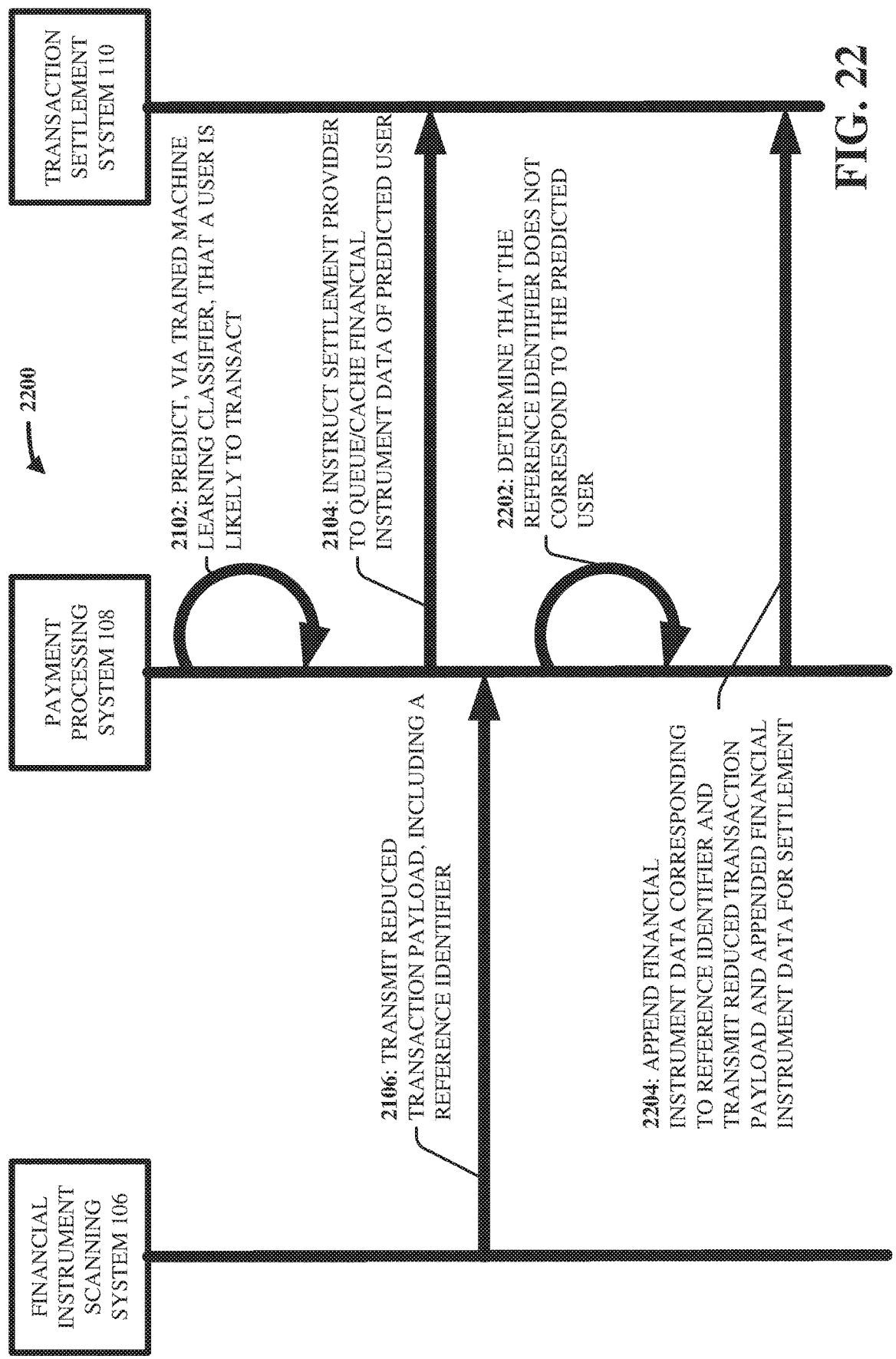

FIGS. 21-22 illustrate high-level block diagrams of an example, non-limiting communication workflows 2100 and 2200 that can facilitate implementation of reduced transaction information payloads based on transaction predictions for quicker computerized payment processing in accordance with one or more embodiments described herein.

Consider the communication workflow 2100. In various embodiments, the payment processing system 108 can predict, via a trained machine learning classifier (e.g., 1602), that a user (e.g., 1604) is likely to transact (e.g., this can be a generic and/or unspecific prediction that does not identify a particular merchant and/or location at which the user is likely to transact), at act 2102.

In various instances, the payment processing system 108 can instruct the transaction settlement system 110 to queue/cache financial instrument data of the predicted user, at act 2104.

In various aspects, the financial instrument scanning system 106 can transmit to the payment processing system 108 a reduced transaction payload (e.g., 1802), which can include a reference identifier, at act 2106.

In various cases, the payment processing system 108 can determine that the reference identifier included in the reduced transaction payload corresponds to the predicted user, at act 2108.

In various instances, the payment processing system 108 can transmit to the transaction settlement system 110 the reduced transaction payload so that the queued/cached transaction can be settled.

Consider the communication workflow 2200. As shown, the acts 2102-2106 can be the same as described above. In various embodiments, the payment processing system 108 can determine that the reference identifier included in the reduced transaction payload does not match and/or correspond to the predicted user, at act 2202.

In various instances, the payment processing system 108 can append to the reduced transaction payload financial instrument data corresponding to the reference identifier included in the reduced transaction payload, and the payment processing system 108 can transmit both the reduced transaction payload and the appended financial instrument data to the transaction settlement system 110 for settlement, at act 2204.

Various embodiments of the subject innovation can involve the spawning of electronic tokens (e.g., child tokens) that can reduce an amount of wasted memory/storage space on an offline card reader device. In various aspects, an offline card reader device can scan a payment card to extract payment information, can determine whether the payment information is already stored in a local database as a result of a previous transaction, and, if so, can store an electronic token indicating that the payment information of the current transaction is the same as the payment information of the identified previous transaction. Various embodiments of the subject innovation can involve a referential construct that can be implemented to reduce a processing/settlement time associated with electronic payment transfers. Specifically, a customer that is likely to transact can be predicted via machine learning, known payment data associated with the predicted customer can be queued/cached at a settlement provider, and a reduced transaction data payload can be received that includes context data of a transaction involving the predicted customer and that excludes payment data of the predicted customer.

In various aspects, a payment service provider can have a set of associated reference metadata (e.g., credit card number, loyalty ID) correlated against a set of reference IDs. However, the payment service provider can lack certain minimal but key/crucial transaction data such as transaction time, amount, and/or authorization/authentication ID. In various cases, the payment service provider can queue a transaction skeleton to a transaction settlement engine while it waits for the minimal but key/crucial transaction data. In various aspects, the minimal but key/crucial transaction data can be availed via an offline card reader when the offline card reader synchronizes with the network. As an example, the payment service provider can queue known data on a probable transaction (e.g., such as reference ID, credit card number, customer ID, merchant ID, merchant address, customer contact number, card reader device ID, customer loyalty ID, and/or so on). In various instances, the payment service provider can wait to receive the transaction time, the transaction amount, and/or the authorization/authentication ID from an offline card reader. In some cases, such data can be marked as pending in the queued transaction skeleton. During synchronization, an offline card reader can pass along only that pending data as part of its payload to the payment service provider and/or to the settlement engine. Because the offline card reader not need to also pass along the known, non-pending data that is already queued in the transaction skeleton, computing resources can be saved and processing/settling time can be reduced.

Figure 23:
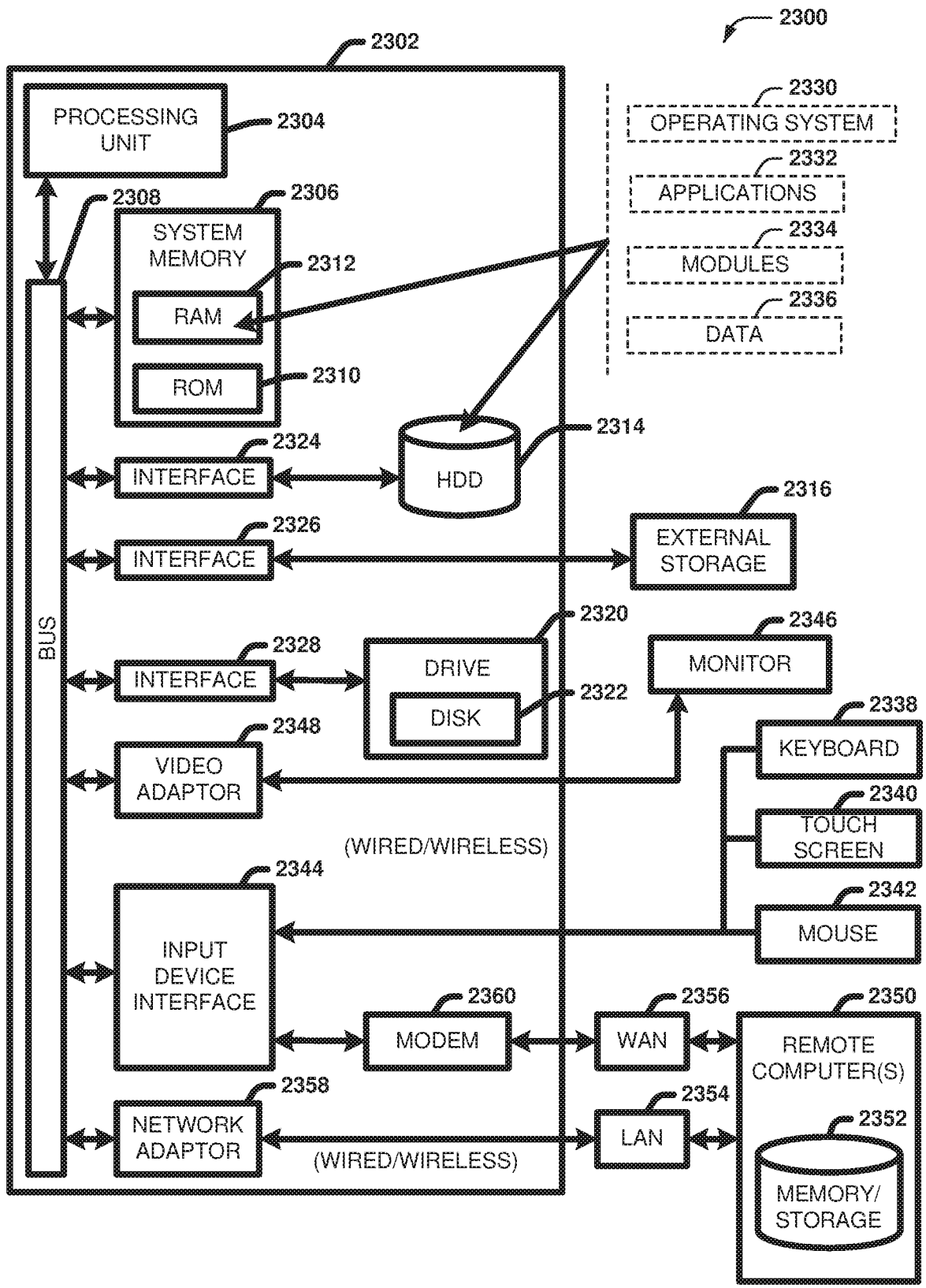
FIG. 23 illustrates a block diagram of an example, non-limiting operating environment in which one or more embodiments described herein can be facilitated.

In order to provide additional context for various embodiments described herein, FIG. 23 and the following discussion are intended to provide a brief, general description of a suitable computing environment 2300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23, the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), one or more external storage devices 2316 (e.g., a magnetic floppy disk drive (FDD) 2316, a memory stick or flash drive reader, a memory card reader, etc.) and a drive 2320, e.g., such as a solid state drive, an optical disk drive, which can read or write from a disk 2322, such as a CD-ROM disc, a DVD, a BD, etc. Alternatively, where a solid state drive is involved, disk 2322 would not be included, unless separate. While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314. The HDD 2314, external storage device(s) 2316 and drive 2320 can be connected to the system bus 2308 by an HDD interface 2324, an external storage interface 2326 and a drive interface 2328, respectively. The interface 2324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for applications 2332. Runtime environments are consistent execution environments that allow applications 2332 to run on any operating system that includes the runtime environment. Similarly, operating system 2330 can support containers, and applications 2332 can be in the form of containers, which are lightweight, standalone, executable packages of software that include, e.g., code, runtime, system tools, system libraries and settings for an application.

Further, computer 2302 can be enable with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a USB port, an IR interface, a BLUETOOTH® interface, etc.

A monitor 2346 or other type of display device can be also connected to the system bus 2308 via an interface, such as a video adapter 2348. In addition to the monitor 2346, a computer typically includes other peripheral output devices (not shown), such as speakers, printers, etc.

The computer 2302 can operate in a networked environment using logical connections via wired and/or wireless communications to one or more remote computers, such as a remote computer(s) 2350. The remote computer(s) 2350 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2352 is illustrated. The logical connections depicted include wired/wireless connectivity to a local area network (LAN) 2354 and/or larger networks, e.g., a wide area network (WAN) 2356. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2354 through a wired and/or wireless communication network interface or adapter 2358. The adapter 2358 can facilitate wired or wireless communication to the LAN 2354, which can also include a wireless access point (AP) disposed thereon for communicating with the adapter 2358 in a wireless mode.

When used in a WAN networking environment, the computer 2302 can include a modem 2360 or can be connected to a communications server on the WAN 2356 via other means for establishing communications over the WAN 2356, such as by way of the Internet. The modem 2360, which can be internal or external and a wired or wireless device, can be connected to the system bus 2308 via the input device interface 2344. In a networked environment, program modules depicted relative to the computer 2302 or portions thereof, can be stored in the remote memory/storage device 2352. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above, such as but not limited to a network virtual machine providing one or more aspects of storage or processing of information. Generally, a connection between the computer 2302 and a cloud storage system can be established over a LAN 2354 or WAN 2356 e.g., by the adapter 2358 or modem 2360, respectively. Upon connecting the computer 2302 to an associated cloud storage system, the external storage interface 2326 can, with the aid of the adapter 2358 and/or modem 2360, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 24:
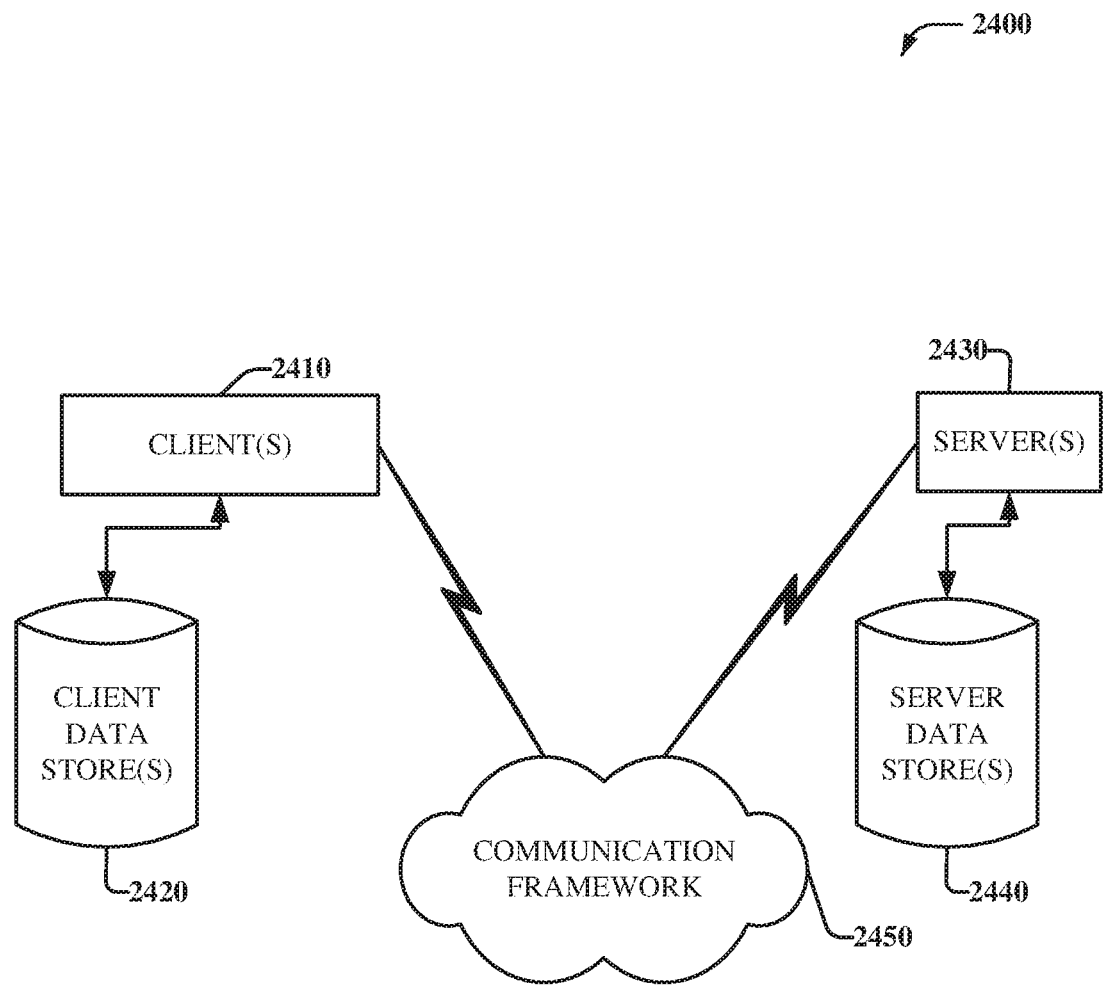
FIG. 24 illustrates an example networking environment operable to execute various implementations described herein.

FIG. 24 is a schematic block diagram of a sample computing environment 2400 with which the disclosed subject matter can interact. The sample computing environment 2400 includes one or more client(s) 2410. The client(s) 2410 can be hardware and/or software (e.g., threads, processes, computing devices). The sample computing environment 2400 also includes one or more server(s) 2430. The server(s) 2430 can also be hardware and/or software (e.g., threads, processes, computing devices). The servers 2430 can house threads to perform transformations by employing one or more embodiments as described herein, for example. One possible communication between a client 2410 and a server 2430 can be in the form of a data packet adapted to be transmitted between two or more computer processes. The sample computing environment 2400 includes a communication framework 2450 that can be employed to facilitate communications between the client(s) 2410 and the server(s) 2430. The client(s) 2410 are operably connected to one or more client data store(s) 2420 that can be employed to store information local to the client(s) 2410. Similarly, the server(s) 2430 are operably connected to one or more server data store(s) 2440 that can be employed to store information local to the servers 2430.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable instructions stored in a memory, which causes the processor to:

maintain a database that correlates a plurality of users to a plurality of financial instrument data and to a plurality of reference identifiers;

predict, via a trained machine learning classifier, that a user from the plurality of users is likely to initiate a transaction within a threshold period of time;

transmit an instruction to a computerized transaction settlement system causing the computerized transaction settlement system to cache financial instrument data from the plurality of financial instrument data that corresponds to the predicted user;

transmit to a computerized financial instrument scanning system a reference identifier from the plurality of reference identifiers that corresponds to the predicted user;

receive a reduced transaction information payload from the computerized financial instrument scanning system after the computerized financial instrument scanning system scans a financial instrument associated with the reference identifier corresponding to the predicted user; and transmit the reduced transaction information payload to the computerized transaction settlement system, wherein the computerized transaction settlement system settles the transaction based on the reduced transaction information payload and based on the cached financial instrument data corresponding to the predicted user.

2. The system of claim 1, wherein the computerized financial instrument scanning system extracts first financial instrument data from the financial instrument, determines that the first financial instrument data corresponds to the reference identifier that corresponds to the predicted user, and generates the reduced transaction information payload by locally storing a child token instead of the first financial instrument data.

3. The system of claim 1, wherein the reduced transaction information payload excludes the financial instrument data corresponding to the predicted user.

4. The system of claim 3, wherein the reduced transaction information payload includes a time of the transaction or an amount charged in the transaction.

5. The system of claim 1, wherein the computer-executable instructions are further executable to cause the processor to:

predict, via the trained machine learning classifier, that the transaction is likely to default, and transmit another instruction to the computerized transaction settlement system causing the computerized transaction settlement system to un-cache the financial instrument data corresponding to the predicted user.

6. The system of claim 1, wherein the computer-executable instructions are further executable to cause the processor to:

determine that the threshold period of time has elapsed; and transmit another instruction to the computerized transaction settlement system causing the computerized transaction settlement system to un-cache the financial instrument data corresponding to the predicted user.

7. The system of claim 1, wherein the trained machine learning classifier receives as input at least one of a transaction history of the predicted user, a browsing history of the predicted user, preferences of the predicted user, or demographics of the predicted user.

8. A system, comprising:

a processor that executes computer-executable instructions stored in a memory, which causes the processor to:

maintain a database that correlates a plurality of users to a plurality of financial instrument data and to a plurality of reference identifiers;

predict, via a trained machine learning classifier, that one or more users from the plurality of users are likely to transact within a threshold period of time;

transmit an instruction to a computerized transaction settlement system causing the computerized transaction settlement system to cache one or more financial instrument data from the plurality of financial instrument data that correspond to the one or more predicted users;

receive from a computerized financial instrument scanning system a reduced transaction information payload that includes a reference identifier from the plurality of reference identifiers;

determine whether a user corresponding to the reference identifier corresponds to the one or more predicted users; and in response to determining that the user corresponds to the one or more predicted users, transmit the reduced transaction information payload to the computerized transaction settlement system.

9. The system of claim 8, wherein the computerized financial instrument scanning system is a first computerized financial instrument scanning system, the reduced transaction information payload is a first reduced transaction information payload, the reference identifier is a first reference identifier, and the user is a first user, wherein the computer-executable instructions are further executable to cause the processor to:

receive from a second computerized financial instrument scanning system a second reduced transaction information payload that includes a second reference identifier from the plurality of reference identifiers;

determine whether a second user corresponding to the second reference identifier corresponds to the one or more predicted users; and in response to determining that the second user does not correspond to the one or more predicted users, append financial instrument data from the plurality of financial instrument data that corresponds to the second reference identifier, and transmit the second reduced transaction information payload and the appended financial instrument data to the second computerized transaction settlement system.

10. The system of claim 8, wherein the computer-executable instructions are further executable to cause the processor to:

predict, via the trained machine learning classifier, that at least one of the one or more predicted users is no longer likely to transact within the threshold period of time, and transmit another instruction to the computerized transaction settlement system causing the computerized transaction settlement system to un-cache the financial instrument data corresponding to the at least one of the one or more predicted users.

11. The system of claim 8, wherein the computer-executable instructions are further executable to cause the processor to:

determine that the threshold period of time has elapsed; and transmit another instruction to the computerized transaction settlement system causing the computerized transaction settlement system to un-cache the financial instrument data corresponding to the one or more predicted users.

12. The system of claim 8, wherein the trained machine learning classifier receives as input at least one of a transaction history of the one or more predicted users, a browsing history of the one or more predicted users, preferences of the one or more predicted users, or demographics of the one or more predicted users.

13. A computer-implemented method, comprising:

maintaining, by a device operatively coupled to a processor, a database that correlates a plurality of users to a plurality of financial instrument data and to a plurality of reference identifiers;

predicting, by the device and via execution of a trained machine learning classifier, that one or more users from the plurality of users are likely to transact within a threshold period of time;

transmitting, by the device, an instruction to a computerized transaction settlement system causing the computerized transaction settlement system to cache one or more financial instrument data from the plurality of financial instrument data that correspond to the one or more predicted users;

receiving, by the device, from a computerized financial instrument scanning system a reduced transaction information payload that includes a reference identifier from the plurality of reference identifiers;

determining, by the device, whether a user corresponding to the reference identifier corresponds to the one or more predicted users; and in response to determining that the user corresponds to the one or more predicted users, transmitting, by the device, the reduced transaction information payload to the computerized transaction settlement system.

14. The computer-implemented method of claim 13, wherein the computerized financial instrument scanning system is a first computerized financial instrument scanning system, the reduced transaction information payload is a first reduced transaction information payload, the reference identifier is a first reference identifier, and the user is a first user, the method further comprising:

receiving from a second computerized financial instrument scanning system a second reduced transaction information payload that includes a second reference identifier from the plurality of reference identifiers;

determining whether a second user corresponding to the second reference identifier corresponds to the one or more predicted users; and in response to determining that the second user does not correspond to the one or more predicted users, appending, by the device, financial instrument data from the plurality of financial instrument data that corresponds to the second reference identifier, and transmitting, by the device, the second reduced transaction information payload and the appended financial instrument data to the second computerized transaction settlement system.

15. The computer-implemented method of claim 13, further comprising:

predicting, by the device and via execution of the trained machine learning classifier, that at least one of the one or more predicted users is no longer likely to transact within the threshold period of time, and transmitting, by the device, another instruction to the computerized transaction settlement system causing the computerized transaction settlement system to un-cache the financial instrument data corresponding to the at least one of the one or more predicted users.

16. The computer-implemented method of claim 13, further comprising:

determining, by the device, that the threshold period of time has elapsed; and transmitting, by the device, another instruction to the computerized transaction settlement system causing the computerized transaction settlement system to un-cache the financial instrument data corresponding to the one or more predicted users.

17. The computer-implemented method of claim 13, wherein the trained machine learning classifier receives as input at least one of a transaction history of the one or more predicted users, a browsing history of the one or more predicted users, preferences of the one or more predicted users, or demographics of the one or more predicted users.

* * * * *